US008600162B2

United States Patent
Tanase et al.

(10) Patent No.: US 8,600,162 B2
(45) Date of Patent: Dec. 3, 2013

(54) IMAGE IDENTIFICATION DEVICE, IMAGE IDENTIFICATION METHOD AND RECORDING MEDIUM

(75) Inventors: Yasushi Tanase, Nerima-ku (JP); Takeshi Miura, Bunkyo-ku (JP); Yasuhiro Todoroki, Musashino (JP); Toshiki Shiino, Bunkyo-ku (JP); Kensuke Habuka, Bunkyo-ku (JP); Tetsuya Hamada, Chiyoda-ku (JP); Yasuyo Yasuda, Chiyoda-ku (JP)

(73) Assignees: Morpho, Inc., Tokyo (JP); NTT DoCoMo, Inc., Tokyo (JP)

( * ) Notice: Subject to any disclaimer, the term of this patent is extended or adjusted under 35 U.S.C. 154(b) by 12 days.

(21) Appl. No.: 13/475,152

(22) Filed: May 18, 2012

(65) Prior Publication Data

US 2012/0301015 A1    Nov. 29, 2012

(30) Foreign Application Priority Data

May 23, 2011    (JP) .................................. 2011-114665

(51) Int. Cl.
*G06K 9/00*    (2006.01)
(52) U.S. Cl.
USPC .......................................... 382/181; 382/190
(58) Field of Classification Search
USPC .................. 382/181–231, 224–228
See application file for complete search history.

(56) References Cited

U.S. PATENT DOCUMENTS

| | | | |
|---|---|---|---|
| 6,195,459 B1* | 2/2001 | Zhu ................................ | 382/176 |
| 7,522,772 B2* | 4/2009 | Porter et al. .................. | 382/218 |
| 2005/0129311 A1* | 6/2005 | Haynes et al. ................. | 382/170 |
| 2006/0029276 A1* | 2/2006 | Nagahashi et al. ............ | 382/173 |
| 2006/0153457 A1* | 7/2006 | Nakamura et al. ............ | 382/190 |
| 2007/0165950 A1* | 7/2007 | Nishida .......................... | 382/177 |
| 2008/0037877 A1* | 2/2008 | Jia et al. ......................... | 382/224 |
| 2008/0075336 A1* | 3/2008 | Luo et al. ....................... | 382/118 |
| 2008/0137917 A1* | 6/2008 | Okubo et al. .................. | 382/118 |
| 2008/0137954 A1* | 6/2008 | Tang et al. ..................... | 382/176 |
| 2008/0199044 A1* | 8/2008 | Tsurumi ........................ | 382/103 |

(Continued)

FOREIGN PATENT DOCUMENTS

| | | |
|---|---|---|
| EP | 2154630 A1 | 2/2010 |
| JP | 2010-045613 A | 2/2010 |

OTHER PUBLICATIONS

European Search Report issued in European Application No. 12161215.4 dated Aug. 23, 2012.

(Continued)

*Primary Examiner* — Alex Liew
(74) *Attorney, Agent, or Firm* — Sughrue Mion, PLLC

(57) ABSTRACT

The invention provides an image identification device uses a separating plane to classify block images into the categories. The image identification device includes a target image input unit inputting a target image, a block image generation unit generates block images, a feature quantity computing unit computes feature quantities of the block images, and a category determination unit determines whether the block images are classified into the categories or not. The feature quantity computing unit uses local feature quantities of the block images and a global feature quantity of the target image as a whole, and also in a feature quantity space using features of the block images as coordinate axes, uses coordinate positions of feature quantity vectors optional areas in the feature quantity space to count the block images and causes the global feature quantity to include the number of the block images thus counted.

6 Claims, 20 Drawing Sheets

(56) References Cited

U.S. PATENT DOCUMENTS

2009/0074288 A1* 3/2009 Nishida .................. 382/159
2010/0150410 A1* 6/2010 Shah et al. .............. 382/118
2012/0300982 A1* 11/2012 Tanase et al. ........... 382/103

OTHER PUBLICATIONS

"Indoor-Outdoor Image Classification". Szummer et al., Content-Based Access of Image and Video Database, 1998. Proceedings, 1998 IEEE International Workshop on Bombay, India Jan. 3, 1998, Los Alamitos, CA, USA, IEEE Comput. Soc, US, Jan. 3, 1998, p. 42-p. 51, XP01026158.

"A Computationally Efficient Approach to Indoor/Outdoor Scene Classification", Serrano et al., Pattern Recognition, 2002. Proceedings. 16th International Conference on Quebec City, Quebec, Canada Aug. 11-15, 2002, Los Alamitos, CA, USA, IEEE Comput. Soc, US vol. 4, Aug. 11, 2002, p. 146-p. 149, XP010613491.

"Learning Primitive and Scene Semantics of Images for Classification and Retrieval", Cheong Yiu Fung et al., Proceedings of the Seventh ACM International Conference on Multimedia(Part 2), Multimedia '99, Jan. 1, 1999, p. 9-p. 12, XP55035591.

"On Image Classification: City Images vs. Landscapes", Vailaya et al., Pattern Recognition, Elsevier, GB, vol. 31, No. 12, Dec. 1, 1998, p. 1921-p. 1935, XP027120415.

* cited by examiner

Fig.3
(A)
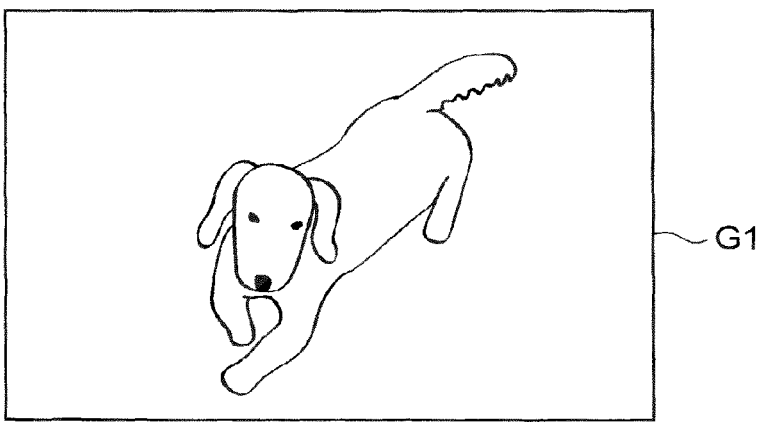
G1
(B)
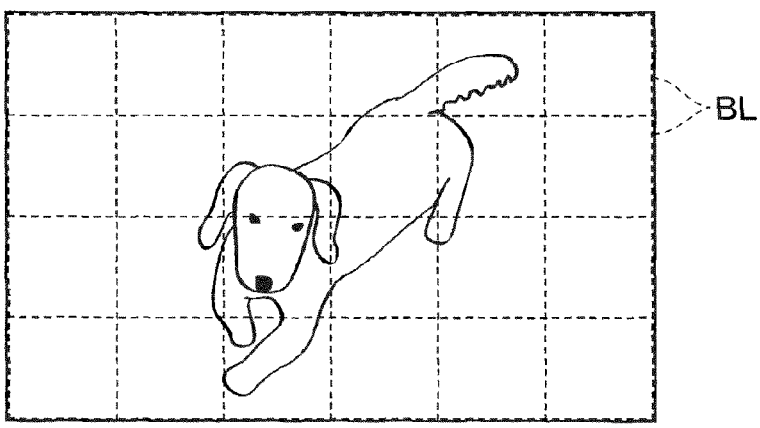
BL
(C)
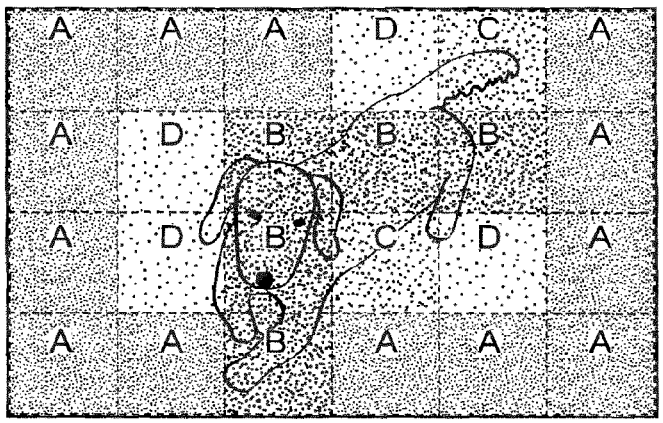

*Fig.4*

| | CLASSIFICATION | FEATURE QUANTITY |
|---|---|---|
| IMAGE ID: OOOO | | |
| BLOCK No.1 | LOCAL FEATURE QUANTITY (local FEATURE QUANTITY) | AVERAGE AND VARIANCE OF PIXEL VALUES (Y, U, V) OF TARGET BLOCK IMAGE |
| BLOCK No.2 | | MAGNITUDES OF EDGE IN HORIZONTAL DIRECTION AND IN VERTICAL DIRECTION OF TARGET BLOCK IMAGE |
| BLOCK No.3 | | RATIO OF MAGNITUDE OF EDGE IN HORIZONTAL DIRECTION TO MAGNITUDE OF EDGE IN VERTICAL DIRECTION IN TARGET BLOCK IMAGE |
| BLOCK No.4 | | FREQUENCY FOR EACH OF CLASSES X1 TO Xn IN HISTOGRAM OF Y OF TARGET BLOCK IMAGE |
| ⋮ | | DEGREE OF SIMILARITY BETWEEN PIXEL VALUE AND SKIN COLOR OF TARGET BLOCK IMAGE |
| BLOCK No.256 | NEIGHBOR FEATURE QUANTITY (neighbor FEATURE QUANTITY) | LOCAL FEATURE QUANTITIES OF RESPECTIVE NEIGHBORING BLOCK IMAGES |
| | | AVERAGE AND VARIANCE OF PIXEL VALUES (Y, U, V) IN COMBINATION WITH NEIGHBORING BLOCK IMAGES B4 AND B5 |
| | | AVERAGE AND VARIANCE OF PIXEL VALUES (Y, U, V) IN COMBINATION WITH NEIGHBORING BLOCK IMAGES B6 AND B8 |
| | SUB-GLOBAL FEATURE QUANTITY (sub-global FEATURE QUANTITY) | AVERAGE AND VARIANCE OF PIXEL VALUES (Y, U, V) OF ALL PIXELS IN HORIZONTAL DIRECTION AND IN VERTICAL DIRECTION |
| | | AVERAGE AND VARIANCE OF PIXEL VALUES (Y, U, V) OF AREA TO WHICH TARGET BLOCK IMAGE BELONGS OUT OF AREAS INTO WHICH ALL PIXELS IN HORIZONTAL DIRECTION AND IN VERTICAL DIRECTION IS BISECTED |
| | | AVERAGE AND VARIANCE OF PIXEL VALUES (Y, U, V) OF PIXELS IN AREA INCLUDING TARGET BLOCK IMAGE AND HAVING CERTAIN SIZE |
| | GLOBAL FEATURE QUANTITY (global FEATURE QUANTITY) | AVERAGE AND VARIANCE OF PIXEL VALUES (Y, U, V) OF TARGET IMAGE |
| | | MAGNITUDE OF EDGE IN HORIZONTAL DIRECTION AND IN VERTICAL DIRECTION OF TARGET IMAGE |
| | | FREQUENCY FOR EACH OF CLASSES X1 TO Xm IN HISTOGRAM OF U OF TARGET IMAGE |
| | | FREQUENCY FOR EACH OF CLASSES X1 TO Xs IN HISTOGRAM OF V OF TARGET IMAGE |
| | | AVERAGE AND VARIANCE OF PIXEL VALUES (Y, U, V) IN FOUR CORNER AREAS OF TARGET IMAGE |
| | | MAGNITUDES OF EDGES IN HORIZONTAL DIRECTION AND IN VERTICAL DIRECTION IN FOUR CORNER AREAS OF TARGET IMAGE |
| | | FREQUENCY FOR EACH OF CLASSES X1 TO Xk IN HISTOGRAM OF MAGNITUDE OF EDGE IN EACH DIRECTION AT ANGULAR INTERVALS OF 45 DEGREES OF BLOCK IMAGES INCLUDED IN TARGET IMAGE |
| | | FREQUENCY FOR EACH OF PATTERNS X1 TO Xq IN WHICH CLASSES ARE COMBINED FOR EACH OF AVERAGE (OR VARIANCE) OF PIXEL VALUES (Y, U, V), MAGNITUDE OF EDGE IN VERTICAL DIRECTION, AND MAGNITUDE OF EDGE IN HORIZONTAL DIRECTION OF BLOCK IMAGES INCLUDED IN TARGET IMAGE |

Fig.6
(A)
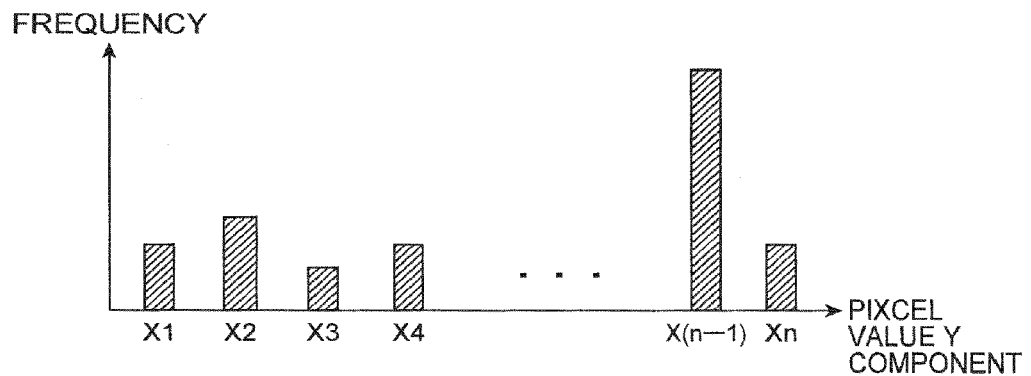
(B)
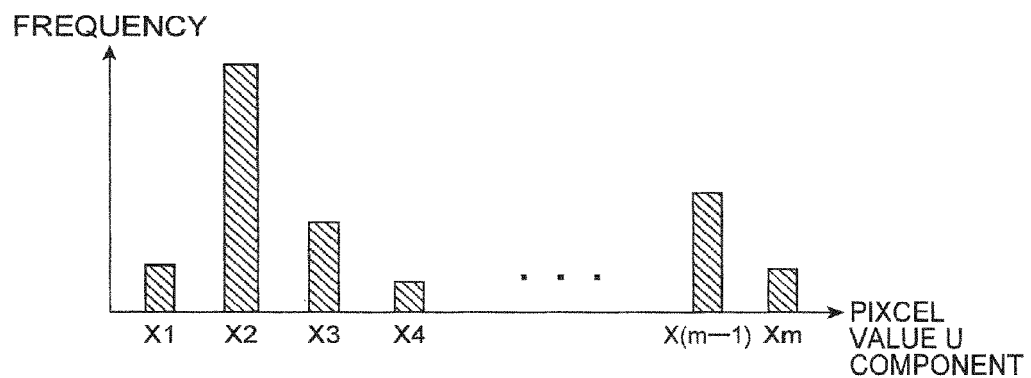
(C)
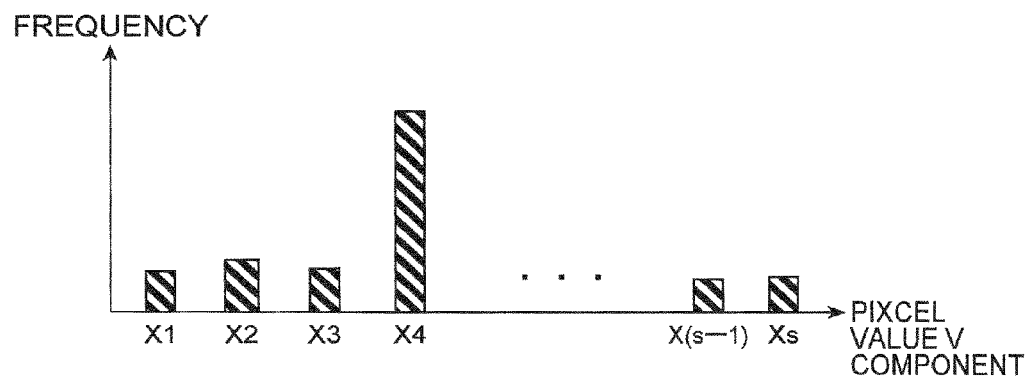

*Fig.8*
(A)
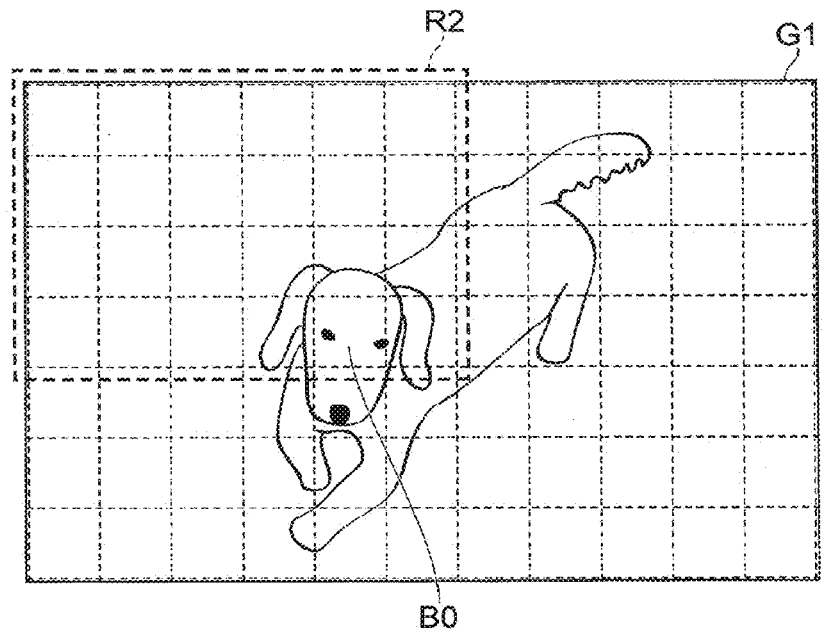
(B)
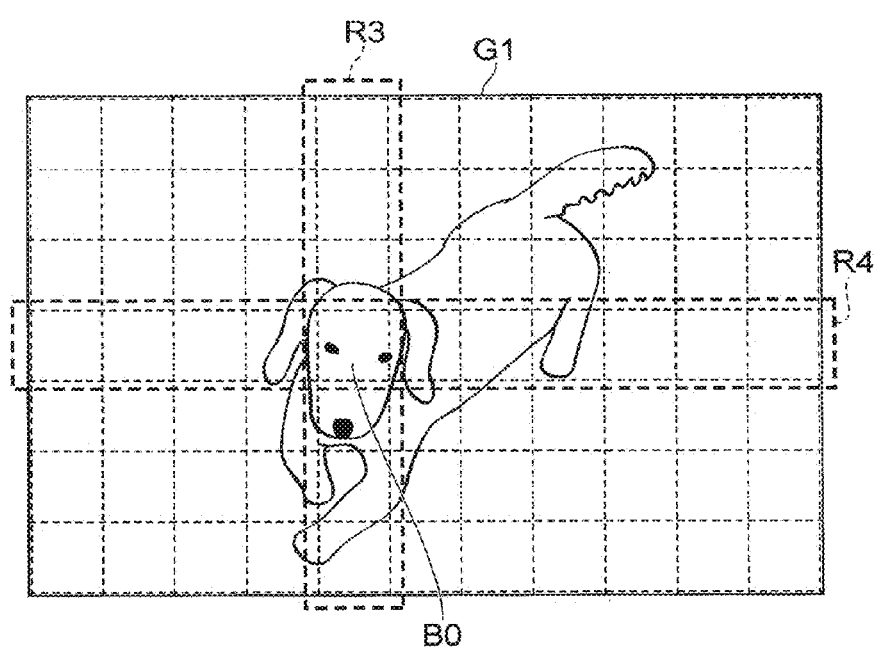

Fig.9
(A)
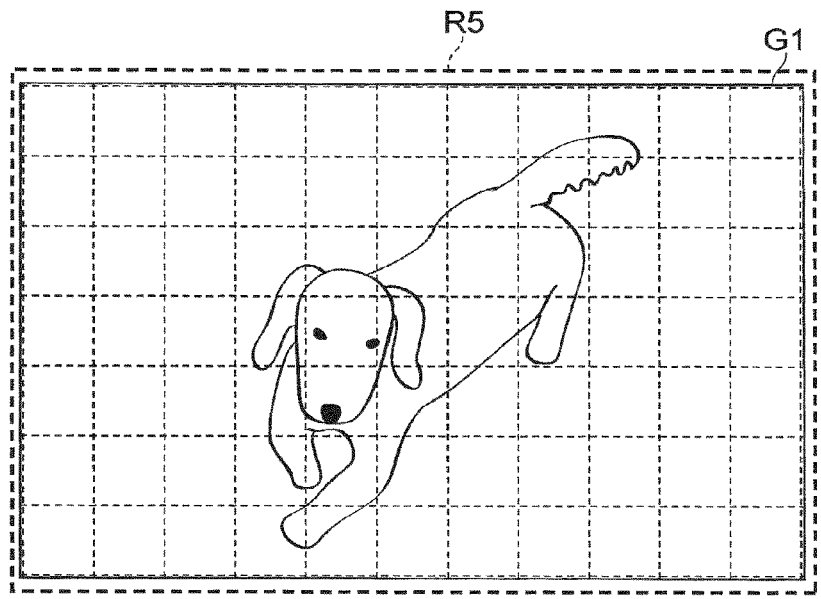
(B)
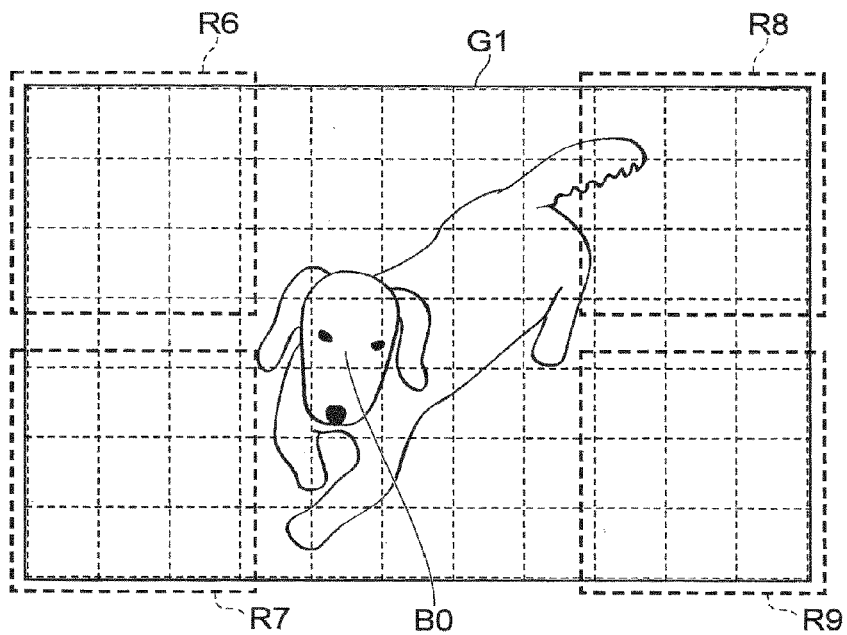

Fig.11
(A)
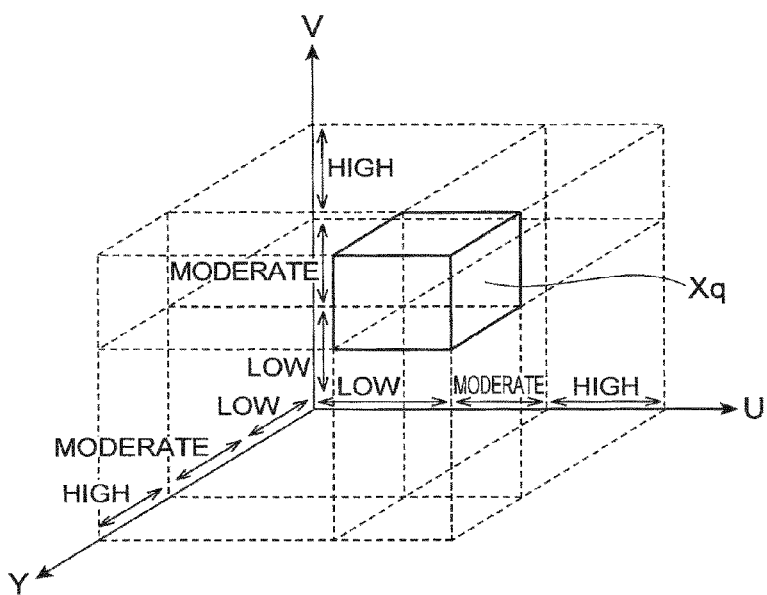
(B)
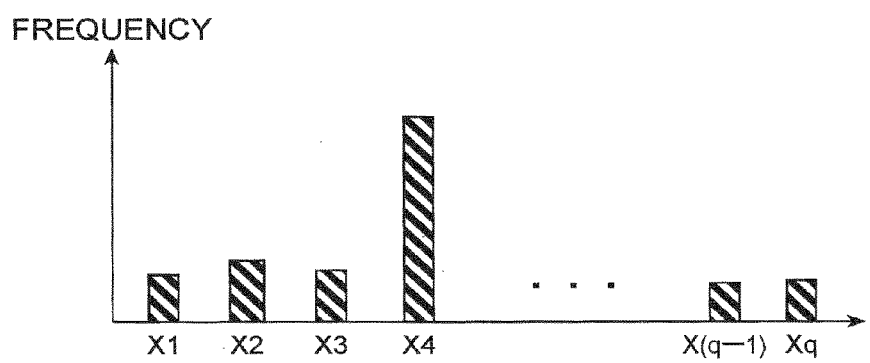

Fig.14
(A)
(B)
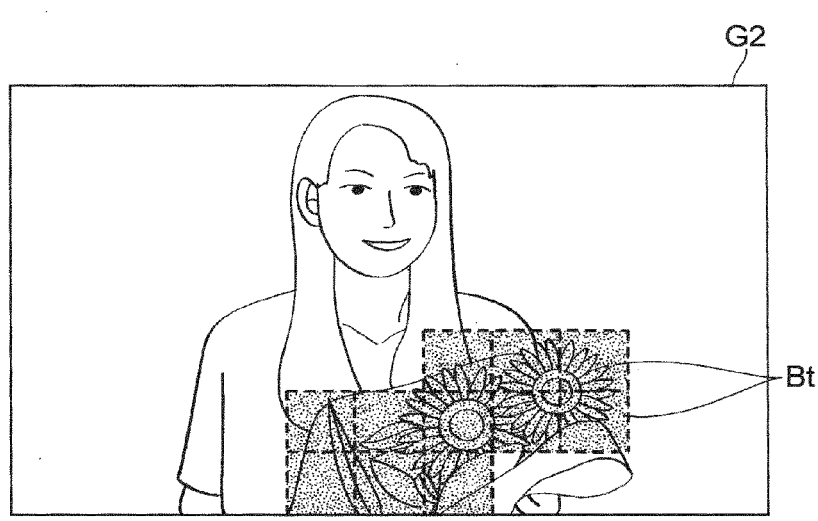

Fig.20
(A)
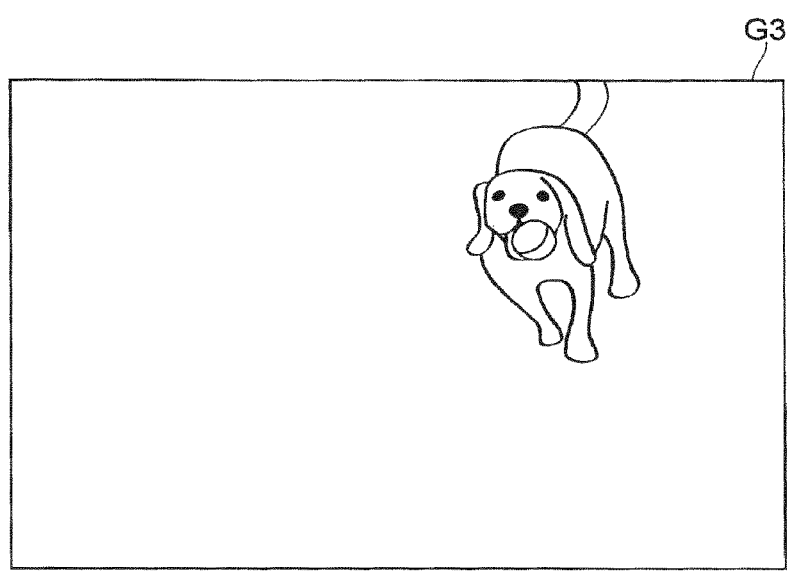
(B)
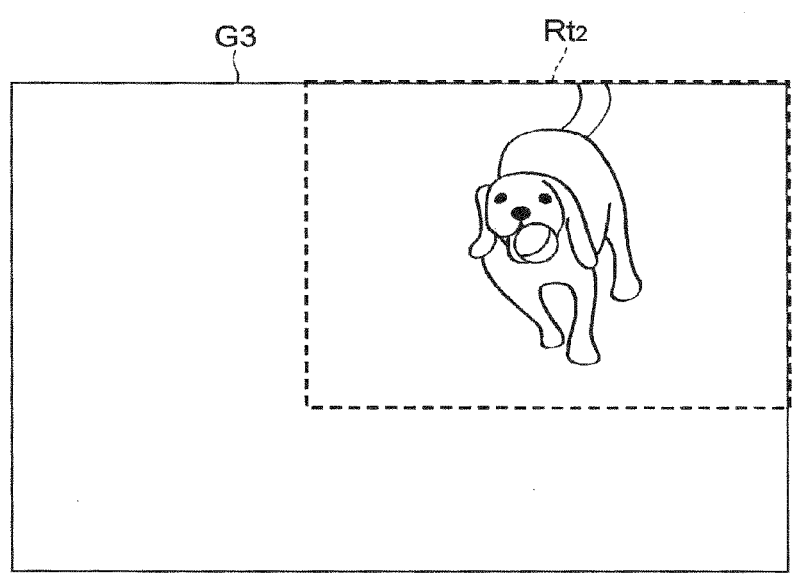

IMAGE IDENTIFICATION DEVICE, IMAGE IDENTIFICATION METHOD AND RECORDING MEDIUM

CROSS-REFERENCE TO RELATED APPLICATIONS

The disclosure of Japanese Patent Application No. JP2011-114665 filed on May 23, 2011 including the specification, drawings and abstract is incorporated herein by reference in its entirety.

BACKGROUND OF THE INVENTION

1. Field of the Invention

Various aspects and embodiments of the present invention relate to an image identification device, an image identification method and a recording medium.

2. Related Background Art

As an image identification device, conventionally known is a device that divides a target image to be identified into blocks to form block images and classifies the block images into a plurality of predetermined categories (see Patent Document 1, for example). A device described in Patent Document 1 uses a training image to learn a separating plane for each category in a feature quantity space using features of an image as coordinate axes and classifies block images into categories on the basis of the separating plane and coordinate positions corresponding to the magnitudes of feature quantities of the block images. The feature quantities of the block images are pieces of image information of these block images (color space information and frequency components).

Patent Document 1: Japanese Unexamined Patent Application Publication No. 2010-45613

SUMMARY OF THE INVENTION

However, in the image identification device described in Patent Document 1, classifying block images into appropriate categories is difficult in some cases. For example, when block images are in all blue, it is difficult to determine whether the category of these blocks is "sky" or "pond".

In the present technical field, desired is an image identification device, an image identification method, and a recording medium that can improve classification accuracy of block images obtained by dividing a target image.

An image identification device according to one aspect of the present invention is an image identification device that learns in advance a separating plane used for classifying images into predetermined categories in a first feature quantity space using a feature of the image as a coordinate axis and uses the separating plane to classify block images obtained by dividing a target image into the categories. The image identification device is configured to include an input unit that inputs the target image, a block image generation unit that divides the target image into a plurality of blocks to generate the block images, a feature quantity computing unit that computes feature quantities of the block images, and a category determination unit that determines whether the block images are classified into one of the categories or not, using the separating plane and coordinate positions corresponding to magnitudes of feature quantities of the block images in the first feature quantity space, wherein the feature quantity computing unit uses, as feature quantities for the block images, local feature quantities calculated according to image information of the block images and a global feature quantity calculated according to image information of the target image as a whole, and also in a second feature quantity space where a plurality of features of the block images are used as coordinate axes, using coordinate positions of feature quantity vectors made by combining the local feature quantities of the block images and using at least one optional area, the number of block images that have the feature quantity vectors belonging to the area is counted on an area-by-area basis to be included in the global feature quantity.

Since the image identification device according to the aspect of the present invention uses, as feature quantities of the block images, not only the local feature quantities calculated according to image information of the block images, but also the global feature quantity calculated according to image information of the target image as a whole, it is possible to classify the block images in consideration of not only information on the block images themselves but also a relationship between the block images and the target image. Accordingly, even when it is impossible to determine categories only according to block images, there is a case in which it becomes possible to determine categories of the block images by looking at the target image as a whole. Furthermore, since the global feature quantity includes the number of block images that are obtained by using coordinate positions of feature quantity vectors made by combining a plurality of local feature quantities of the block images in the second feature quantity space using a plurality of features of the block images as coordinate axes, and one or a plurality of optional areas in the second feature quantity space, and counting block images having feature quantity vectors belonging to the areas on an area-by-area basis, it is possible to combine a plurality of local feature quantities into a new feature quantity to be used. Accordingly, it becomes possible to avoid classifying the block images in a biased manner toward one local feature quantity. Therefore, it is possible to improve classification accuracy of the block images.

Herein, the global feature quantity may include out of the block images included in the target image as a whole, the number of the block images having magnitudes of the local feature quantities equal to or larger than a predetermined value or the number of the block images having magnitudes of the local feature quantities smaller than the predetermined value. By configuring the image identification device in this manner, not only does the global feature quantity becomes a feature quantity in which features of the target image as a whole (e.g., a positional relation of a local feature) are reflected, but also it is possible to reflect local features themselves more strongly in the global feature quantity. Accordingly, there is a case in which it is possible to accurately identify block images that are misidentified when being determined on the basis of the feature quantity of the target image as a whole by compensating with the global feature quantity on which influence of the local feature quantities is strong. Therefore, it is possible to improve classification accuracy of the block images.

Furthermore, the image identification device may include a target area image extraction unit that extracts a target area from the target image to be used as a target area image, wherein the block image generation unit may divide the target area image into a plurality of blocks to generate the block images. By configuring the image identification device in this manner, a target area image is extracted from a target image by the target area image extraction unit, and an identification process is performed for the target area image thus extracted on a block-by-block basis. Accordingly, it is possible to appropriately classify even a target image having a scale change or having a shifted subject position.

In addition, an image identification method according to another aspect of the present invention is an image identification method for learning in advance a separating plane used for classifying images into predetermined categories in a first feature quantity space using a feature of the image as a coordinate axis and then using the separating plane to classify block images obtained by dividing a target image into the categories. The image identification method is configured to include an input step of inputting the target image, a block image generation step of dividing the target image into a plurality of blocks to generate the block images, a feature quantity computing step of computing feature quantities of the block images, and a category determination step of determining whether the block images are classified into one of the categories or not, using the separating plane and coordinate positions corresponding to magnitudes of feature quantities of the block images in the first feature quantity space, wherein at the feature quantity computing step, as feature quantities for the block images, local feature quantities calculated according to image information of the block images and a global feature quantity calculated according to image information of the target image as a whole are used, and also in a second feature quantity space where a plurality of features of the block images are used as coordinate axes, using coordinate positions of feature quantity vectors made by combining the local feature quantities of the block images and using at least one optional area, the number of block images that have the feature quantity vectors belonging to the area is counted on an area-by-area basis to be included in the global feature quantity.

In addition, a recording medium according to still another aspect of the present invention is a computer-readable recording medium in which an image identification program is stored that causes a computer to operate so as to learn in advance a separating plane used for classifying images into predetermined categories in a first feature quantity space using a feature of the image as a coordinate axis and use the separating plane to classify block images obtained by dividing a target image into the categories. The recording medium is configured as a recording medium in which an image identification program is stored that causes the computer to operate as an input unit that inputs the target image, a block image generation unit that divides the target image into a plurality of blocks to generate the block images, a feature quantity computing unit that computes feature quantities of the block images, and a category determination unit that determines whether the block images are classified into one of the categories or not, using the separating plane and coordinate positions corresponding to magnitudes of feature quantities of the block images in the first feature quantity space, wherein the feature quantity computing unit uses, as feature quantities for the block images, local feature quantities calculated according to image information of the block images and a global feature quantity calculated according to image information of the target image as a whole, and also in a second feature quantity space where a plurality of features of the block images are used as coordinate axes, using coordinate positions of feature quantity vectors made by combining the local feature quantities of the block images and using at least one optional area, the number of block images that have the feature quantity vectors belonging to the area is counted on an area-by-area basis to be included in the global feature quantity.

The above-described image identification method and the recording medium in which the image identification program is recorded exert the same effect as the above-described image identification device according to the present invention.

According to the above-described various aspects and embodiments of the present invention, it is possible to improve classification accuracy of block images obtained by dividing a target image.

BRIEF DESCRIPTION OF THE DRAWINGS

FIGS. 3A to 3C are schematic diagrams for explaining image recognition of a target image on a block-by-block basis. FIG. 3A illustrates the target image, FIG. 3B illustrates the target image divided into blocks, and FIG. 3C illustrates the target image classified on a block-by-block basis.

FIG. 4 illustrates one example of image feature quantities for each block.

FIGS. 6A to 6C are examples of histograms of pixel values (brightness value and color difference). FIG. 6A is a histogram of Y component, FIG. 6B is a histogram of U component, and FIG. 6C is a histogram of V component.

FIGS. 8A and 8B are schematic diagrams for explaining sub-global feature quantity. FIG. 8A is a schematic diagram indicating an area extending vertically and horizontally, and FIG. 8B is a schematic diagram indicating an area extending vertically and an area extending horizontally.

FIGS. 9A and 9B are schematic diagrams for explaining a global feature quantity. FIG. 9A is a schematic diagram indicating a whole area, and FIG. 9B is a schematic diagram indicating four corner areas.

FIG. 11A illustrates one example of a global feature quantity into which a plurality of local feature quantities are combined. FIG. 11B is a histogram of the global feature quantity.

FIG. 14A illustrates one example of training data. FIG. 14B is a schematic diagram for explaining learning on a block-by-block basis.

FIGS. 20A and 20B are schematic diagrams for explaining image recognition by using a target area image.

DESCRIPTION OF THE PREFERRED EMBODIMENTS

Figure 1:
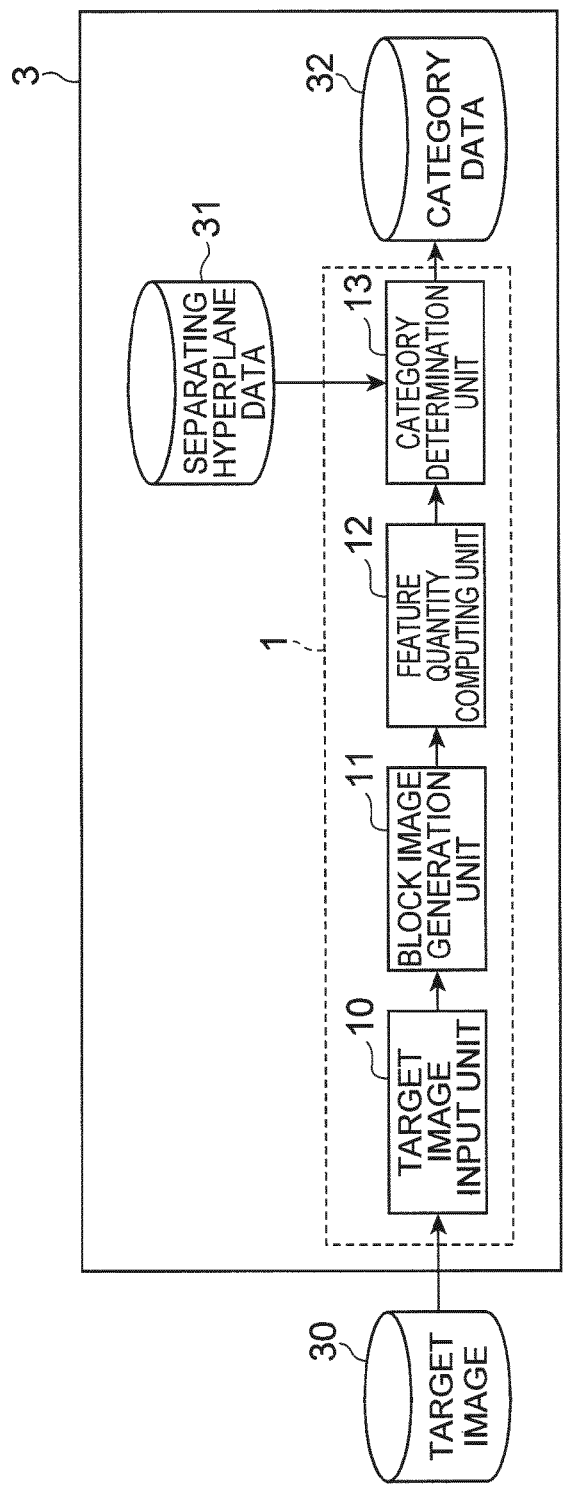
FIG. 1 is a functional block diagram of a mobile terminal incorporating an image identification device according to a first embodiment.

Embodiments of the present invention will be described hereinafter with reference to the attached drawings. Note that like reference signs are given to like parts in descriptions of the drawings, and redundant explanations are omitted. In addition, dimensional ratios in the drawings do not necessarily match those in the descriptions.

First Embodiment

An image identification device according to the present embodiment is a device that divides a target image into a certain size of block images and recognizes a subject on a block-by-block basis, and can be, for example, a device incorporated in a mobile phone, a digital camera, a personal digital assistant (PDA), a conventional computer system, or the like. Note that in the following descriptions, for ease of understanding, as one example of the image identification device according to the present invention, an image identification device incorporated in a mobile terminal will be explained.

Figure 2:
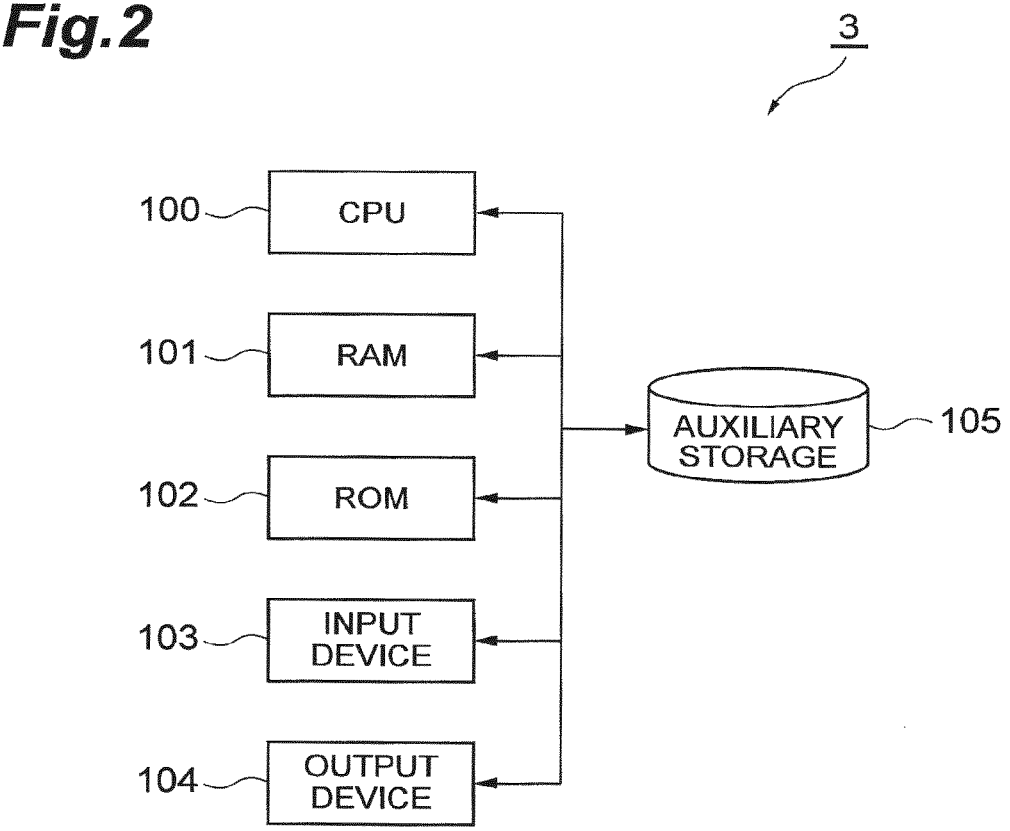
FIG. 2 is a hardware block diagram of the mobile terminal in which the image identification device depicted in FIG. 1 is incorporated.

FIG. 1 is a functional block diagram of this mobile terminal 3 including this image identification device 1 according to the present embodiment. The mobile terminal 3 depicted in FIG. 1 is a mobile terminal carried by a user, for example, and has a hardware configuration depicted in FIG. 2. FIG. 2 is a hardware block diagram of the mobile terminal 3. As depicted in FIG. 2, the mobile terminal 3 is physically configured as a conventional computer system including a central processing unit (CPU) 100, main memories such as a read only memory (ROM) 101 and a random access memory (RAM) 102, an input device 103 such as a camera or a keyboard, an output device 104 such as a display, an auxiliary storage 105 such as a hard disk drive. Each function of the mobile terminal 3 and the image identification device 1 described later is implemented by causing the input device 103 and the output device 104 to operate under control of the CPU 100 by loading predetermined computer software into hardware such as the CPU 100, the ROM 101, and the RAM 102, and additionally by reading and writing data in the main memories or the auxiliary storage 105. Although the above explanation has been made for the case where the mobile terminal 3 has such a hardware configuration, alternatively, the image identification device 1 may be configured as a conventional computer system including the CPU 100, the main memories such as the ROM 101 and the RAM 102, the input device 103, the output device 104, and the auxiliary storage 105. In addition, the mobile terminal 3 may include a communication module or the like.

As depicted in FIG. 1, the mobile terminal 3 includes the image identification device 1, a separating hyperplane data (separating plane data) 31, and category data 32.

The image identification device 1 includes a target image input unit 10, a block image generation unit 11, a feature quantity computing unit 12, and a category determination unit 13. The target image input unit 10 has a function of inputting a target image 30 as image data to be identified. The target image input unit 10, for example, may input the target image 30 captured by a camera incorporated in the mobile terminal 3, or may input the target image 30 via communications. The target image input unit 10 stores the target image 30 in the main memories or the auxiliary storage 105 of the mobile terminal 3, for example.

The block image generation unit 11 has a function of dividing the target image 30 input into blocks each having a certain area to generate block images. For example, the block image generation unit 11 divides a target image G1 depicted in FIG. 3A into a plurality of block images BL as depicted in FIG. 3B. The block image generation unit 11 divides the target image G1 into four blocks high by six blocks wide as depicted in FIG. 3B, for example. Alternatively, the block image generation unit 11 may divide the target image G1 into 16 blocks high by 16 blocks wide, or may divide it in any other ratio. The block image generation unit 11 may first resize the target image G1 such that the length of the long side thereof becomes equal to or smaller than a predetermined value and divide the target image G1 thus resized. The block image generation unit 11 has a function of outputting the block images to the feature quantity computing unit 12.

The feature quantity computing unit 12 has a function of calculating a feature quantity for each of the block images BL. The feature quantity computing unit 12 calculates feature quantities from image information such as pixel values or edge information of the block images BL. In other words, the feature quantities are quantities in which features of a subject are reflected. Note that it is possible to represent the magnitudes of the feature quantities as position coordinates in a feature quantity space (a first feature quantity space) using features as coordinate axes. For example, for a p-dimensional feature quantity, the magnitude of the feature quantity will be represented by a coordinate position of $(\beta_1, \beta_2, \ldots, \beta_p)$. Details of the feature quantities will be described later. The feature quantity computing unit 12 has a function of outputting a feature quantity of each of the block images BL to the category determination unit 13.

The category determination unit 13 has a function of classifying the block images BL into predetermined categories on the basis of feature quantities of the block images BL. Examples of the predetermined categories include, for example, "sea", "mountain", "sky", "evening glow", "red leaves", "cherry blossoms", "snow", "characters/memorandum", "person", "dishes", "beach", "flower", "green", "dog", or "building". In addition, it is acceptable to make the predetermined categories include an "empty set". By presetting the "empty set", when a right category does not exist for an image, instead of forcibly determining the image to belong to an existing category, it is possible to determine the image to belong to the "empty set" (i.e., belong to nothing). Accordingly, it is possible to reduce misclassifications. The separating hyperplane data 31 includes a separating hyperplane that is learned in advance for each of the above-mentioned categories on the basis of training data. The separating hyperplane is defined by the following formula 1 with p-dimensional feature quantity data $J=(\alpha_1, \alpha_2, \ldots, \alpha_p)$, vector=$(w_1, w_2, \ldots, w_p)$, and a constant z.

$$w_1 \cdot \alpha_1 + w_2 \cdot \alpha_2 + \ldots + w_p \cdot \alpha_p + z = 0 \qquad (1)$$

A learning process of the separating hyperplane data 31 will be described later. The category determination unit 13 refers to the separating hyperplane data 31 and classifies the block images BL into the above-mentioned categories. The category determination unit 13 determines whether the block images BL are classified into the above-mentioned categories. The category determination unit 13 compares a feature quantity of each of the block images BL with a separating hyperplane for a given category and, when the magnitude of the feature quantity is larger than the separating hyperplane, determines the block image to belong to the category. On the other hand, the category determination unit 13, when the magnitude of the feature quantity is not larger than the separating hyperplane, determines the block diagram not to belong to the category. For example, it is assumed that four categories A to D are set in advance, and learning the respective separating hyperplanes therefor has been completed. As depicted in FIG. 3C, the category determination unit 13 compares a feature quantity of each of the block images BL with the separating hyperplane for each of the categories A to D to classify the block images BL into the categories A to D. More specifically, the category determination unit 13 compares, in the feature quantity space, the separating hyperplane for each category represented by the above formula 1 with p-dimensional feature quantity data $O=(\beta_1, \beta_2, \ldots, \beta_p)$ obtained by the feature quantity computing unit 12. For example, the category determination unit 13 substitutes feature quantity data obtained from the image feature quantity computing process into the left-hand side of the above formula 1 for each category to calculate the signed distance between the separating hyperplane and coordinates $(\beta_1, \beta_2, \ldots, \beta_p)$ in the feature quantity space, and judges the sign of the distance. Note that the category determination unit 13, when determining that a magnitude of a feature quantity of a block image BL is not larger than any hyperplane, judges the block image BL to be "not applicable". In addition, when a block image BL belongs to two or more categories, the category determination unit 13 determines that the block image BL belongs to the category into which the block image BL has been classified first in the order of comparison. The category determination unit 13 outputs the output results to the category data 32.

Details of feature quantities will be described hereinafter. The feature quantity computing unit 12 adopts four feature quantities as feature quantities of a block image as depicted in FIG. 4. FIG. 4 illustrates feature quantities for each of blocks No. 1 to No. 256 in a target image (image ID: OOOO).

Figure 5:
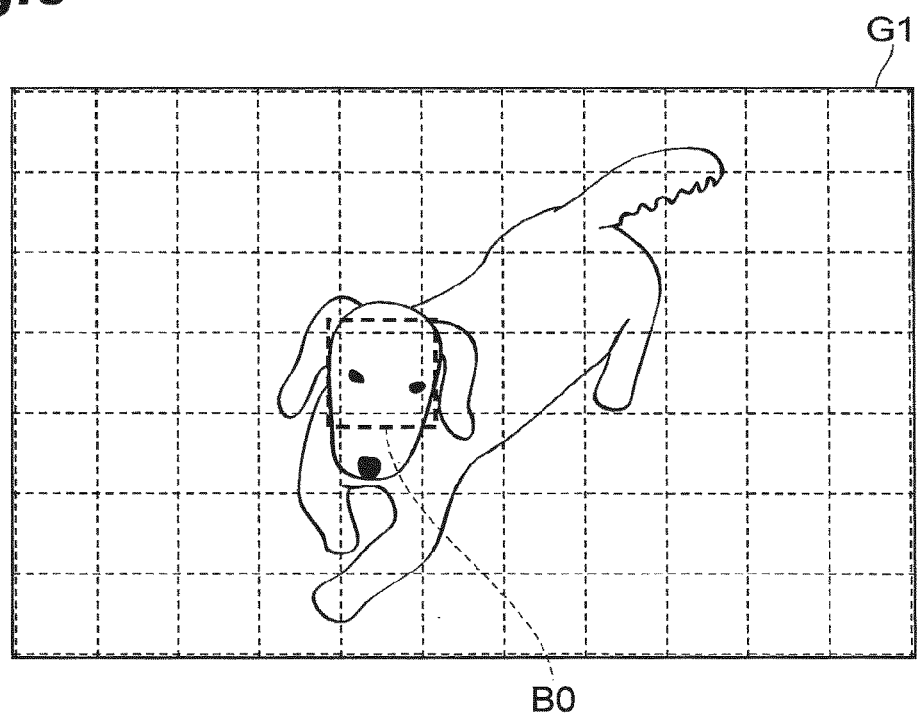
FIG. 5 is a schematic diagram for explaining local feature quantities.

The first feature quantity is a local feature quantity. The local feature quantity is calculated according to image information of the block image itself to be classified. For example, the local feature quantity is calculated by using image information of a given target block image B0 of the target image G1 depicted in FIG. 5. The local feature quantity includes, for example, the average and the variance of each of pixel values (Y component, U component, V component) of the target block image B0, the magnitude of an edge in the horizontal direction and the magnitude of the edge in the vertical direction in the target image B0, the ratio of the magnitude of the edge in the horizontal direction with respect to the magnitude of the edge in the vertical direction in the target block image B0, a histogram of Y component in the target block image B0, or the degree of similarity between a pixel value and skin color of the target block image B0.

Note that the degree of similarity between a pixel value and skin color of the target block image B0 is a feature quantity included for identifying the category "person", and it is acceptable not to adopt such feature quantity when predetermined categories do not include the "person".

The case of including histograms of pixel values as a feature quantity will be described. FIGS. 6A to 6C are histograms for the respective components of the pixel values, and the abscissa represents a pixel value component and the ordinate represents frequency. As depicted in FIGS. 6A to 6C, the pixel value component is classified into classes with a predetermined range interval. For example, as depicted in FIG. 6A, pixel values 0 to 255 in Y component are classified into classes X1 to Xn (n is an integer of two or more). As also depicted in FIG. 6B, pixel values 0 to 255 in U component are classified into classes X1 to Xm (m is an integer of two or more). As also depicted in FIG. 6C, pixel values 0 to 255 in V component are classified into classes X1 to Xs (s is an integer of two or more). For example, in a block image, when there are two pixels whose pixel values belong to the class X1 in Y component, "two" becomes the feature quantity. The first feature quantity includes frequency for each of the classes X1 to Xm depicted in the Y-component histogram as a feature quantity.

Figure 7:
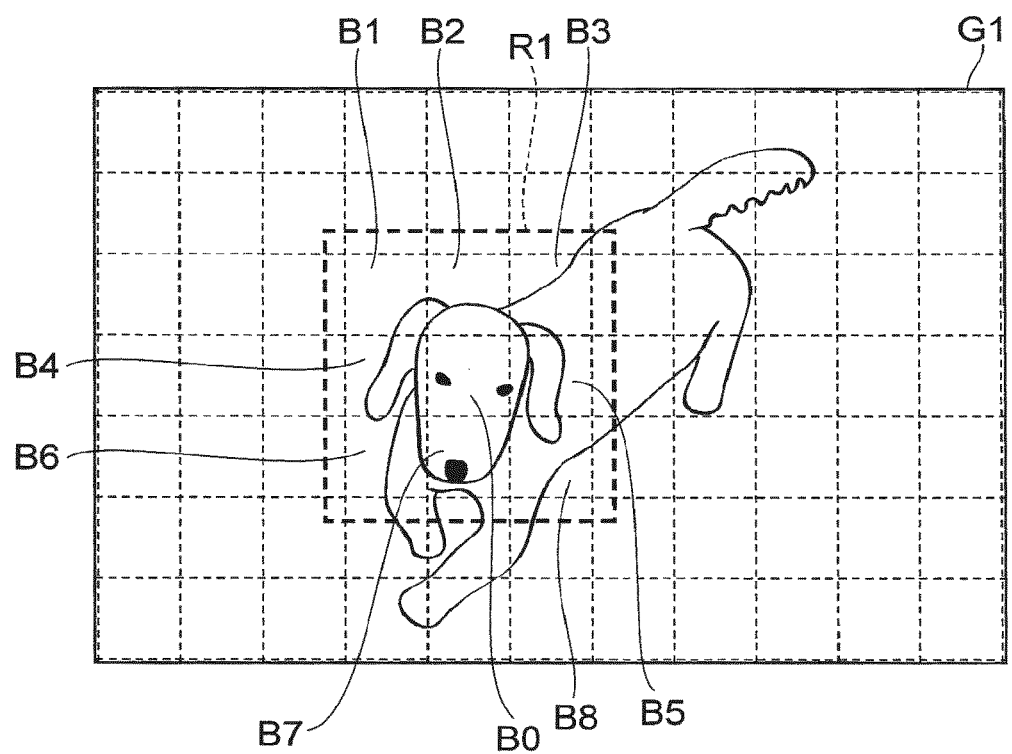
FIG. 7 is a schematic diagram for explaining neighbor feature quantities.

The second feature quantity is a neighbor feature quantity. The neighbor feature quantity is calculated according to image information of neighboring block images that surround the target block image. For example, the neighbor feature quantity is calculated according to the image information of neighboring block images B1 to B8 that surround the predetermined target block image B0 of the target image G1 depicted in FIG. 7. The neighbor feature quantity includes, for example, local feature quantities of the neighboring block images B1 to B8, the average and the variance of pixel values (Y, U, V) in combination with the neighboring block images B4 and B5, or the average and the variance of pixel values (Y, U, V) in combination with the neighboring block images B6 and B8.

Feature quantities for the neighboring block images B4 and B5 and feature quantities for the neighboring block images B6 and B8 are used for judging symmetry of the neighboring block images. For example, for the category "sky", feature quantities tend to be uniform on average and, for the category "person", feature quantities around the person tend to be uniform on average in the background. In this manner, it is acceptable to calculate a feature quantity by using neighboring block images selected from eight neighboring block images.

The third feature quantity is a sub-global feature quantity. The sub-global feature quantity is calculated according to image information of a partial area that constructs of a plurality of block images and in which the target block image is included. For example, as depicted in FIG. 8A, the sub-global feature quantity is calculated according to image information of a partial area R2 in which the predetermined target block image B0 of the target image G1 is included. Alternatively, the sub-global feature quantity may be calculated according to image information of an area within a circle having its center at the target block image and a certain diameter. As also depicted in FIG. 8B, the sub-global feature is calculated according to image information of a partial area in which the predetermined target block image B0 of the target image G1, the partial area being a partial area R3 constructed of a vertical array of block images or a partial area R4 constructed of a horizontal array of block images. Alternatively, the sub-global feature quantity may be calculated according to image information of a partial area to which the target block image B0 belongs out of areas into which the partial area R3 or R4 is bisected. In other words, the sub-global feature quantity includes, for example, the average and the variance of pixel values (Y, U, V) of all pixels in the horizontal direction and in the vertical direction within the partial areas, the average and the variance of pixel values (Y, U, V) in areas to which the target block image belong out of areas into which all pixels in the horizontal direction and in the vertical direction within the partial areas are bisected, or the average and the variance of pixel values (Y, U, V) of pixels in an area including the target block image and having a certain size.

By using image information of the partial area R3 constructed of a vertical array of block images or image information in the vertical direction within the partial area, it is possible to use the sub-global feature quantity as a feature quantity in which changes in the vertical direction varying by category are reflected. In addition, by using image information of the partial area R4 constructed of a horizontal array of block images or image information in the horizontal direction within the partial area, it is possible to use the sub-global feature quantity as a feature quantity enabling easy classification of a category such as the category "sky" in which similar pixels tend to be arranged in the horizontal direction.

The fourth feature quantity is a global feature quantity. The global feature quantity is calculated according to image information of the target image as a whole. For example, the global feature quantity is calculated according to image information of the target image G1 as a whole (global area R5) depicted in FIG. 9A. The global feature quantity is also calculated according to image information of four corner areas R6 to R9 in the target image G1 being in a rectangular shape depicted in FIG. 9B. In other words, the global feature quantity includes, for example, the average and the variance of pixel values (Y, U, V) of the target image G1, the magnitude of an edge in the horizontal direction and the magnitude of the edge in the vertical direction of the target image G1, the frequency for each of the classes X1 to Xm in the U-component histogram of the target image G1, the frequency for each of the classes X1 to Xs in the V-component histogram of the target image G1, the average and the variance of pixel values (Y, U, V) in the four corner areas R6 to R9 of the target image G1, the magnitudes of edges in the horizontal direction and the magnitudes of edges in the vertical direction in the four corner areas R6 to R9 of the target image G1, or the frequency for each of classes X1 to Xk (k is an integer of two or more) in a histogram of the magnitude of an edge in each direction at angular intervals of 45 degrees of block images included in the target image.

By including the pixel values (Y, U, V) in the four corner areas R6 to R9 of the target image G1, the magnitude of the edge in the horizontal direction in the four corner areas R6 to R9 and the magnitude of the edge in the vertical direction of the target image G1, it is possible to classify block images by using features arising in areas at the corners of the target image G1. When a person shoots an image of a circular object such as a dish, from an image-shooting aesthetic point of view, it is often the case that the person shoots the image so that the rim portion of the dish is arranged at four corners. Accordingly, it is possible to appropriately classify the circular object by using the image information in the four corner areas R6 to R9. In each of directions at angular intervals of 45 degrees (0°, 45°, 90°, 135°) of block images included in the target image, in the same manner as in FIG. 6A, by representing the magnitude of the edge in each direction in the classes X1 to Xk and defining the number of pixels belonging to each of the classes X1 to Xk as a feature quantity, when shooting an image of a set meal with a plurality of dishes arranged from above, for example, it is possible to appropriately classify rim portions of a plurality of circular objects. Alternatively, it is acceptable to divide the whole image G1 into 16 pieces or 9 pieces and to use the count of edge values at four corners of the divided areas to be combined to a feature quantity. In this case, it is similarly possible to appropriately classify the rim portions of the circular objects.

Figure 10:
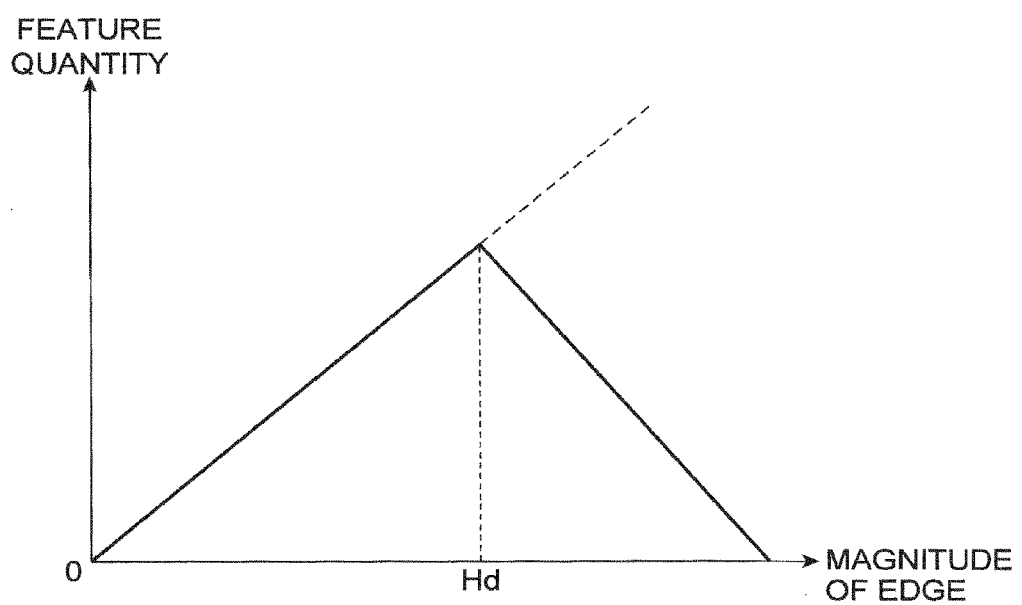
FIG. 10 is a schematic diagram for explaining a feature quantity of edge magnitude.

The frequency for each of the classes X1 to Xm in the U-component histogram of the target image G1 and the frequency for each of the classes X1 to Xs in the V-component histogram of the target image G1 are similar to those depicted in FIGS. 6B and 6C. In addition, when the magnitude of an edge is equal to or larger than a predetermined value, it is acceptable to give low evaluation conversely. For example, as depicted in FIG. 10, it is acceptable to define a relationship between the magnitude of an edge and a feature quantity such that the feature quantity simply increases until the magnitude of the edge reaches a predetermined threshold Hd and simply decreases when the magnitude of the edge becomes equal to or larger than the predetermined threshold Hd. In this case, it is possible to distinguish a block image having a moderate edge magnitude compared with a block image having a small edge magnitude and a block image having a large edge magnitude. For example, it is possible to distinguish between "characters" having a large edge magnitude and "sea" having a moderate edge magnitude.

The global feature quantity herein includes as a feature quantity, other than the above-described feature quantities, the number of block images that satisfies a predetermined condition on the magnitude of feature quantity. For example, in a case of a brightness value, the global feature quantity includes the number of block images having a brightness value Y whose magnitude is equal to or larger than a predetermined value. Alternatively, the global feature quantity includes as a feature quantity the number of block images having a brightness value Y whose magnitude is smaller than the predetermined value. Since it is possible to define blocks whose feature quantities are similar as a feature quantity, it is possible to strongly reflect a feature of each block image in the global feature quantity compared with the above-described global feature quantity. Furthermore, the predetermined condition may be a condition that a feature quantity belongs within a predetermined range. In an example of a brightness value, the global feature quantity may include as a feature quantity the number of block images having brightness values Y whose magnitudes are equal to or larger than a first threshold and are equal to or smaller than a second threshold. In this manner, instead of adopting only a binarized condition whether the magnitude of a feature quantity is larger or smaller than a predetermined value as the predetermined condition, by adopting a condition whether the feature quantity is included within a predetermined range or not, it is possible to use information of whether the feature quantity is moderate or not for making a decision.

Alternatively, the global feature quantity may include as a feature quantity the number of block images that satisfy a predetermined condition on the magnitudes of a plurality of feature quantities. For example, an example of pixel values (Y, U, V) will be explained. By dividing the magnitudes of Y component, U component, and V component of a brightness value into three classes of low, middle, and high, the number of combinations of the respective classes can be 3×3×3 equating to 27 patterns. A plurality of classes can be set by setting a plurality of thresholds (predetermined values) for each of the feature quantities. To which pattern out of the 27 patterns of class combinations the respective averages of the Y-component, U-component, and V-component magnitudes belong is determined on a block-by-block basis, and the number (frequency) of block images belonging to each pattern is set as a feature quantity. For example, as depicted in FIG. 11A, the number of block images corresponding to a combination pattern Xq in which the respective averages of magnitudes of pixel values (Y, U, V) in each of block images become (high, high, high) is set as the feature quantity. By combining classes of feature quantities, as depicted in FIG. 11B, patterns X1 to Xq become new classes and the number (frequency) of block images belonging to the classes becomes a feature quantity. By adopting combined classes, it is possible to simultaneously acquire blocks whose feature quantities are similar to each other. In addition, by combining a plurality of feature quantities to form new classes and setting frequency as a feature quantity, it is possible to avoid biased determination depending on one certain feature quantity.

Figure 12:
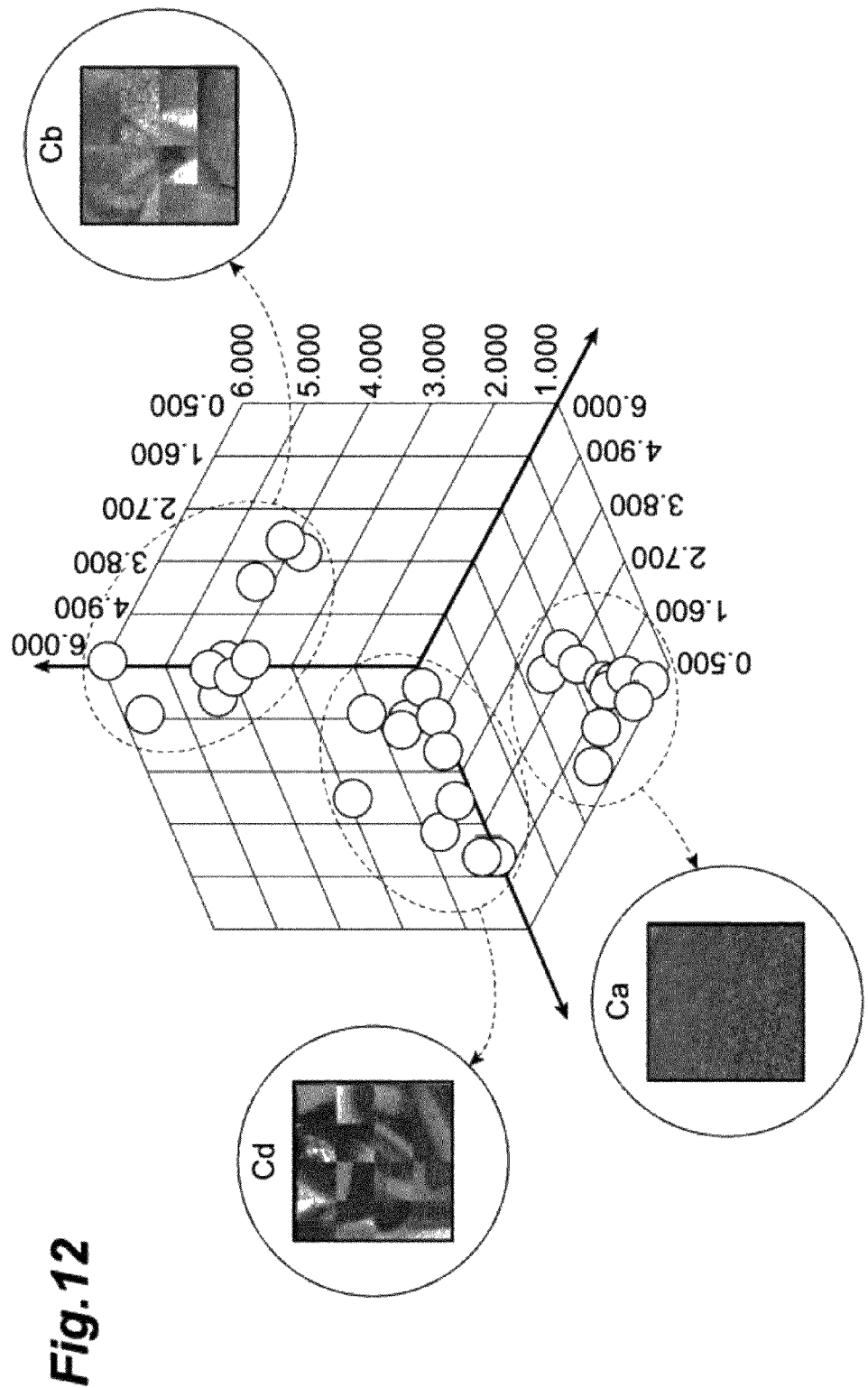
FIG. 12 illustrates one example of a global feature quantity.

In the above-described examples, combination of pixel values has been explained, but feature quantities used for combination are not limited to such pixel values. With a combination of feature quantities whose types are different from each other, it is possible to define a new feature quantity representing a complex feature. For the new feature quantity, in a feature quantity space using u features as coordinate axes (u dimensions: a second feature quantity space), for example, a plurality of local feature quantities as a u-dimensional feature quantity vector (f1, f2, . . . , fu) are used. The u-dimensional feature quantity space is divided into q regions in advance. By this division, in each region, distances between any vectors in the region are short, which results in a plurality of local feature quantities being similar to each other. Accordingly, it is easy to extract co-occurrence between the local feature quantities. Since each block image belongs to any one of the q regions, to which region all block images included in a whole image belong is determined, the number of block images belonging to an optional region Zi ($1 \leq i \leq q$) is counted, and this count value for each region is adopted into a global feature quantity. In this manner, by adopting a combination of various feature quantities, it is possible to simultaneously make a judgment based on not only the above-described combination of colors but also edge information, which is a completely different type of feature quantity. For example, when cherry blossoms are to be recognized, it is necessary to capture pink and fine edges as its feature. By combining a red color component that is a feature quantity for identifying "pink color", a blue color component and a green color component, and an edge for identifying "fine edge", it is possible to acquire the number of block images having "pink and fine edges", specifically the number of block images having similar features of cherry blossoms. FIG. 12 illustrates a feature quantity space in which clustering is performed to recognize "dog" as depicted in FIG. 3A, for example. For example, when it is assumed that "a class including a greenish image having an edge without orientation" is Ca, "a class including an image looking like dog skins" is Cb, and "a class including a blackish image having a sharp edge" is Cd, the number of block images belonging to each of the classes (regions) becomes a feature quantity for each in the feature quantity space in which clustering is performed.

In addition, a plurality of feature quantities to be combined are not limited to numbers. For example, as depicted in FIG. 4, it is acceptable to combine five feature quantities of Y-component pixel values in each block image, the average or the variance of the respective magnitudes of U component and V component, the magnitude of an edge in the vertical direction in the block image, and the magnitude of the edge in the horizontal direction in the block image to create a pattern, and define the frequency thereof as a feature quantity. When dividing each class into three, $3^5=243$ patterns are formed.

Figure 13:
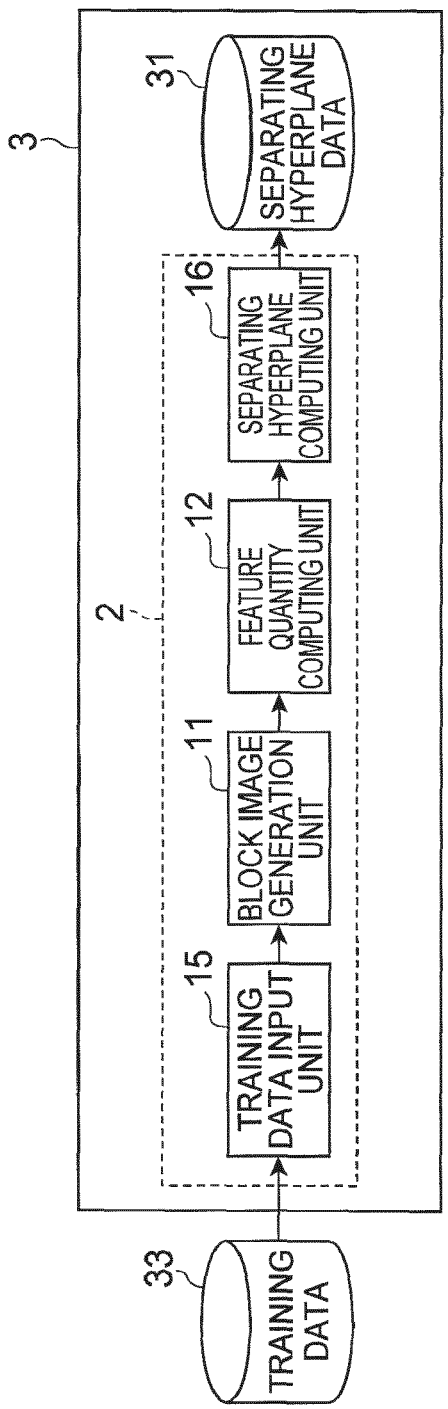
FIG. 13 is a functional block diagram of a device that learns a separating hyperplane.

A learning process of the separating hyperplane data 31 that is performed before the operation of the image identification device 1 will be described hereinafter. FIG. 13 is a functional block diagram of the mobile terminal 3 having a learning device 2. As depicted in FIG. 13, the mobile terminal 3 includes the learning device 2 and the separating hyperplane data 31. Note that the learning device 2 may be fabricated by a computer other than the mobile terminal 3 as needed.

The image identification device 1 includes a training data input unit 15, the block image generation unit 11, the feature quantity computing unit 12, and a separating hyperplane computing unit 16. The training data input unit 15 has a function of inputting a training image 33 as image data to be learned. FIG. 14A is one example of a training image G2 for learning a correct answer for the category "flower". In addition, as depicted in FIG. 14B, information indicating that "flower" is drawn at positions of blocks Bt is made included in training data. In other words, the training data in FIG. 14 is image blocks labeled with the category of the correct answer. The training data may include an image block labeled with a category of an incorrect answer. The training data is prepared for each of the predetermined categories. The training data input unit 15, for example, may input the training image 33 by a camera incorporated in the mobile terminal 3 or may input the training image 33 via communications. The training data input unit 15 stores the target image 30 in the main memories or the auxiliary storage 105 of the mobile terminal 3, for example.

The block image generation unit 11 has a function of dividing the training image 33 input into blocks each having a certain area to generate block images as described above. The feature quantity computing unit 12 has a function of calculating a feature quantity for each of the block images as described above. The feature quantity computing unit 12 has a function of outputting a feature quantity of the block images to the separating hyperplane computing unit 16.

Figure 15:
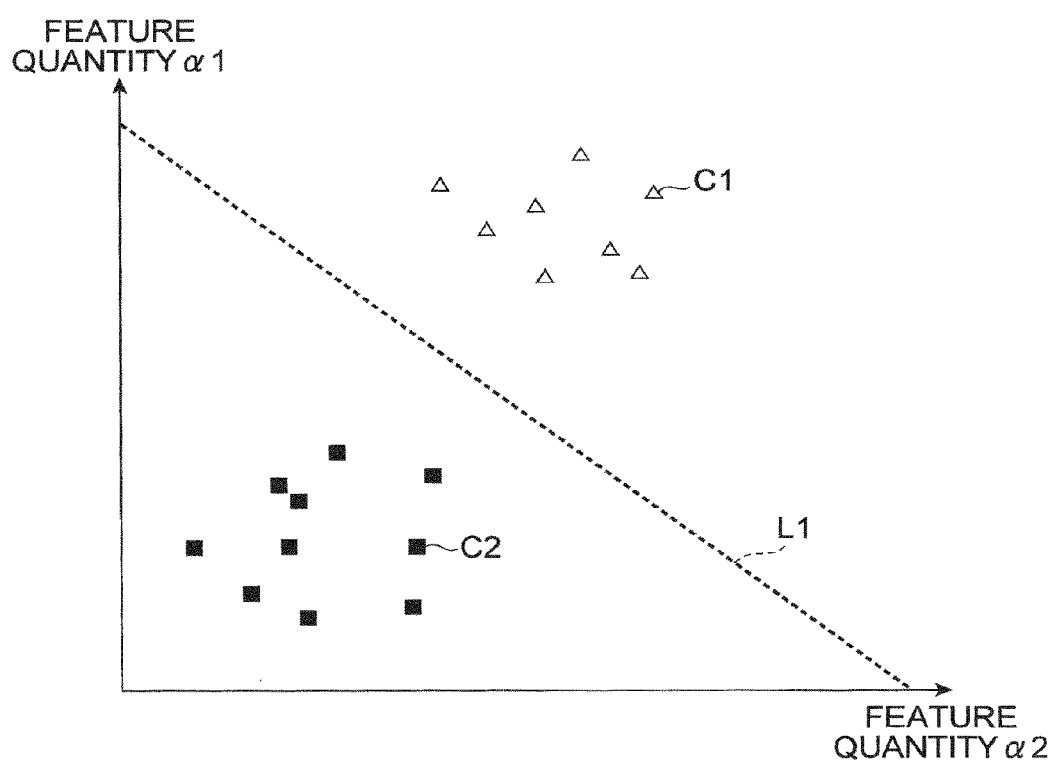
FIG. 15 is a schematic diagram for explaining a separating hyperplane.

The separating hyperplane computing unit 16 has a function of inputting an image feature quantity for each category and calculating a separating hyperplane for each category. The separating hyperplane computing unit 16 calculates a separating hyperplane by using a dedicated library of a linear support vector machine (SVM) that is widely used as a learning algorithm, for example. For ease of understanding, a separating hyperline in a feature quantity plane in two-dimensional image feature quantities α1 and α2 will be described hereinafter. As depicted in FIG. 15, with image feature quantity α1 as abscissa and image feature quantity α2 as ordinate, training data C1 of correct answer and training data C2 of incorrect answer are plotted. In this case, the separating hyperplane computing unit 16 learns a separating hyperline L1 that is a straight line separating the training data C1 of correct answer and the training data C2 of incorrect answer by the linear SVM. The results of the learning are recorded as the separating hyperplane data 31. Note that in a case of p dimensions (p>2: p is an integer), the feature quantity plane becomes a feature quantity space and the separating hyperline becomes a separating hyperplane. Therefore, the separating hyperplane is a concept including the separating hyperline, and the feature quantity space is a concept including the feature quantity plane.

Figure 16:
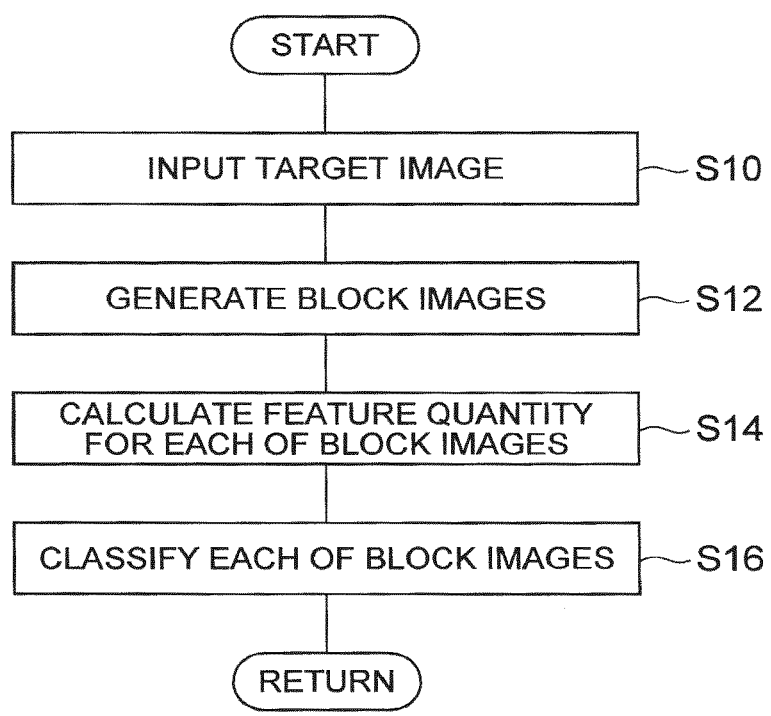
FIG. 16 is a flowchart illustrating operation of the image identification device depicted in FIG. 1.

Operation of the image identification device 1 according to the present embodiment will be described hereinafter. FIG. 16 is a flowchart illustrating identification operation of the image identification device 1 according to the present embodiment. A control process depicted in FIG. 16 is performed after the execution of the above-described learning process and at the timing when a process start button included in the mobile terminal 3 is turned on, for example.

As depicted in FIG. 16, the target image input unit 10 inputs a target image (S10: input step). When the process at S10 is completed, the flow proceeds to a block image generation process (S12: block image generation step). In the process at S12, the block image generation unit 11 divides the target image input in the process at S10 to generate block images. When the process at S12 is completed, the flow proceeds to a feature quantity calculation process (S14: feature quantity computing step). In the process at S14, the feature quantity computing unit 12 calculates a feature quantity for each of the block images generated in the process at S12. For example, the feature quantity computing unit 12 calculates feature quantities depicted in FIG. 4 for each of the block images. When the process at S14 is completed, the flow proceeds to a classification process (S16: category determination step). In the process at S16, the category determination unit 13 compares the feature quantities calculated in the process at S16 for each of the block images with the already-learned separating hyperplane data 31 and, with respect to block images having feature quantities of larger magnitudes than a separating hyperplane for a predetermined category, determines that these block images belong to the category. When categories are determined for all block images, the control process depicted in FIG. 16 ends.

An image identification program for causing the mobile terminal 3 (computer) to function as the image identification device 1 will be described hereinafter.

The image identification program includes a main module, input module, and a computation processing module. The main module is a unit that controls image processing in a centralized manner. The input module causes the mobile terminal 3 to operate so as to acquire an input image. The computation processing module includes a block image dividing module, a feature quantity computing module, and a category determination module. Functions implemented by operating the main module, the input module, and the computation processing module are the same as the functions of the target image input unit 10, the block image generation unit 11, the feature quantity computing unit 12, and the category determination unit 13 of the image identification device 1 described above.

The image identification program is provided by a storage medium such as a ROM or a semiconductor memory. Alternatively, the image identification program may be provided as a data signal via a network.

The image identification device 1 according to the first embodiment described above uses, as a feature quantity of the target block image B0, not only a local feature quantity calculated according to image information of the target block image B0 but also a global feature quantity calculated according to image information of the target image G1 as a whole, and thus can classify the target block image B0 considering not only information of the target block image B0 itself but also a relationship between the target block image B0 and the target image G1. Accordingly, even when it is impossible to determine the category only according to the target block image B0, looking at the target image G1 as a whole makes it possible to determine the category of the target block image B0. For example, when the target block image B0 is blue, it is difficult to determine whether the category is "sky" or "sea" according to image information of the target block image B0. However, if a feature quantity for determining whether it is "sky" or "sea" can be acquired in a global feature quantity, it becomes possible to determine the category of the target block image B0.

In addition, when the global feature quantity does not include the number of block images in which the magnitudes of local feature quantities are equal to or larger than a predetermined value, the global feature quantity as a whole tends to represent a vague and simplified feature. For example, when an image in which images of "sea" and "beach" are captured has been learned, an overall feature indicating that "the sea lies above the beach" can be obtained. In the case of such a learning result, when determining a target image in which a brown desk is drawn, an area where the desk is drawn is correctly recognized to be in the category "not applicable", but when determining a target image in which a blue object is positioned on the brown desk, the blue object and the desk are respectively recognized to be "sea" and "beach" incorrectly in some cases. In contrast, by including as a feature quantity the number of block images whose magnitudes of local feature quantities are equal to or larger than the predetermined value or the number of block images whose magnitudes of local feature quantities are smaller than the predetermined value, as a global feature quantity, out of block images included in the target image G1 as a whole, not only does the global feature quantity become a feature quantity in which features of the target image G1 as a whole (e.g., a positional relationship of a local feature) are reflected, but also it is possible to reflect local features themselves more strongly in the global feature quantity. Accordingly, the block image B0 that is incorrectly recognized when being determined according to a feature quantity of the target image G1 as a whole can be correctly recognized by compensating with a global feature quantity having a strong influence of local feature quantities. In the above-described example, since the feature of the blue object is reflected in the global feature quantity as the number of blocks and the number of the blocks can be determined to be smaller than that of "sea", it becomes possible to determine that the blue object itself is not "sea". Accordingly, it is possible to avoid classifying the desk as "beach". Therefore, it is possible to improve classification accuracy of block images.

In addition, since the image identification device 1 according to the first embodiment combines a plurality of local feature quantities into a new quantity feature and can classify block images by using the new quantity feature, it becomes possible to avoid classifying the block images in a biased manner toward one local feature quantity. Therefore, it is possible to avoid a biased determination.

Furthermore, with the image identification device 1 according to the first embodiment, since local feature quantities are classified into a plurality of classes on the basis of the magnitudes of the local feature quantities, and the global feature quantity includes as a feature quantity the number of block images that have local feature quantities belonging to the classes, it is possible to use the global feature quantity as a finer feature quantity with a plurality of local feature quantities combined.

Second Embodiment

An image identification device 1 according to a second embodiment is configured substantially in the same manner as the image identification device 1 according to the first embodiment and is different in that it extracts a plurality of areas from a target image, divides the areas thus extracted to generate block images to be classified. The following description will be made focusing on differences from the image identification device 1 according to the first embodiment, and redundant explanations are omitted.

Figure 17:
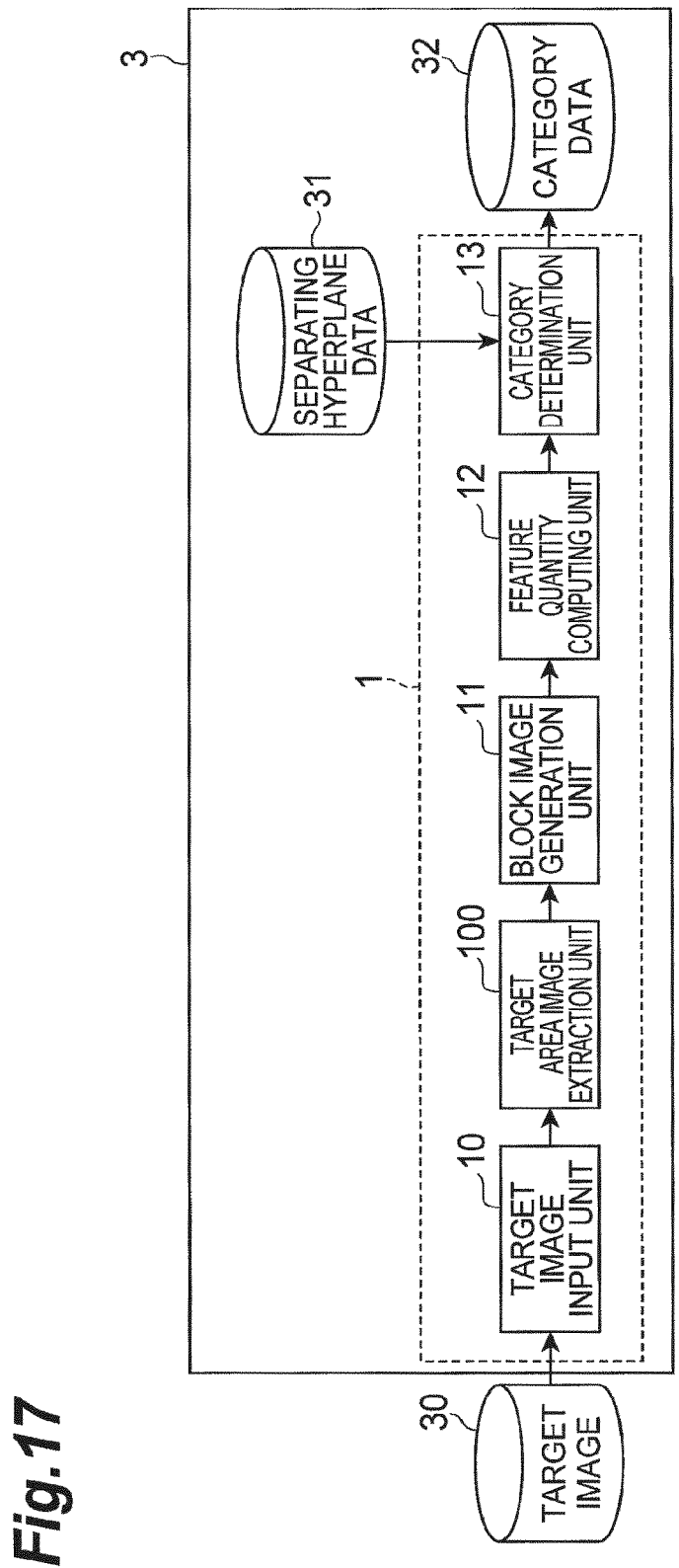
FIG. 17 is a functional block diagram of a mobile terminal incorporating an image identification device according to a second embodiment.

FIG. 17 is a functional block diagram of a mobile terminal including the image identification device 1 according to the second embodiment. Note that a hardware configuration thereof is the same as that of the image identification device 1 according to the first embodiment. As depicted in FIG. 17, the image identification device 1 includes a target area image extraction unit 100.

The target area image extraction unit 100 extracts target area images having a predetermined size from a target image. For example, the target area image extraction unit 100 extracts a plurality of target areas that overlap each other from the target image to form respective target area images. The target area image extraction unit 100 output the target area images to the block image generation unit 11. The block image generation unit 11 has a function of dividing the target area images into blocks each having a certain area to generate block images. In addition, the category determination unit 13 superimposes a classification result for each of the target area images to form classification results of the block images in the target image. The other configurations are the same as those of the image identification device 1 according to the first embodiment.

Figure 18:
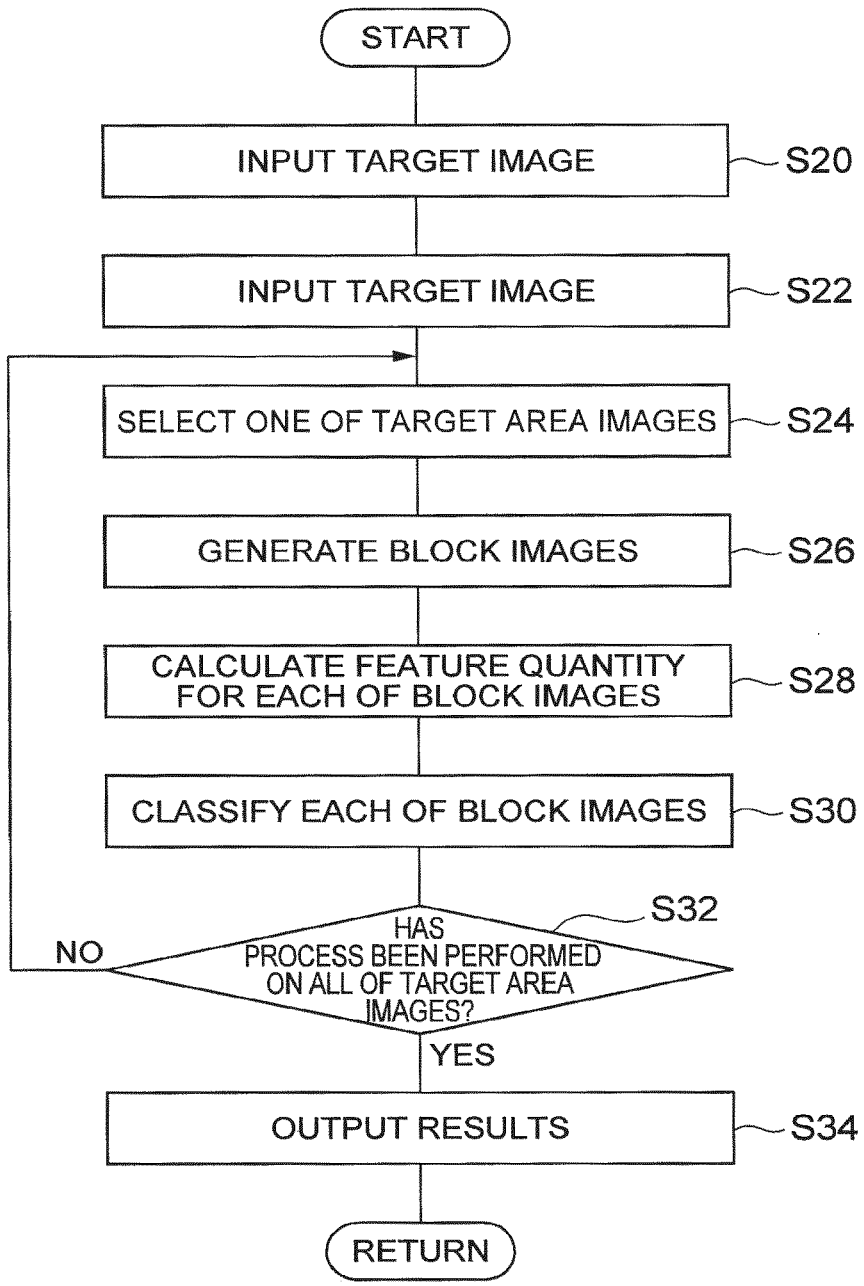
FIG. 18 is a flowchart illustrating operation of the image identification device depicted in FIG. 17.

Operation of the image identification device 1 according to the present embodiment will be described hereinafter. FIG. 18 is a flowchart illustrating the operation of the image identification device 1 according to the present embodiment. A control process depicted in FIG. 18 is performed after the execution of the learning process described in the first embodiment and at the timing when a process start button included in the mobile terminal 3 is turned on, for example.

As depicted in FIG. 18, the target image input unit 10 inputs a target image (S20). When the process at S20 is completed, the flow proceeds to an extracting process of target area images (S22).

Figure 19:
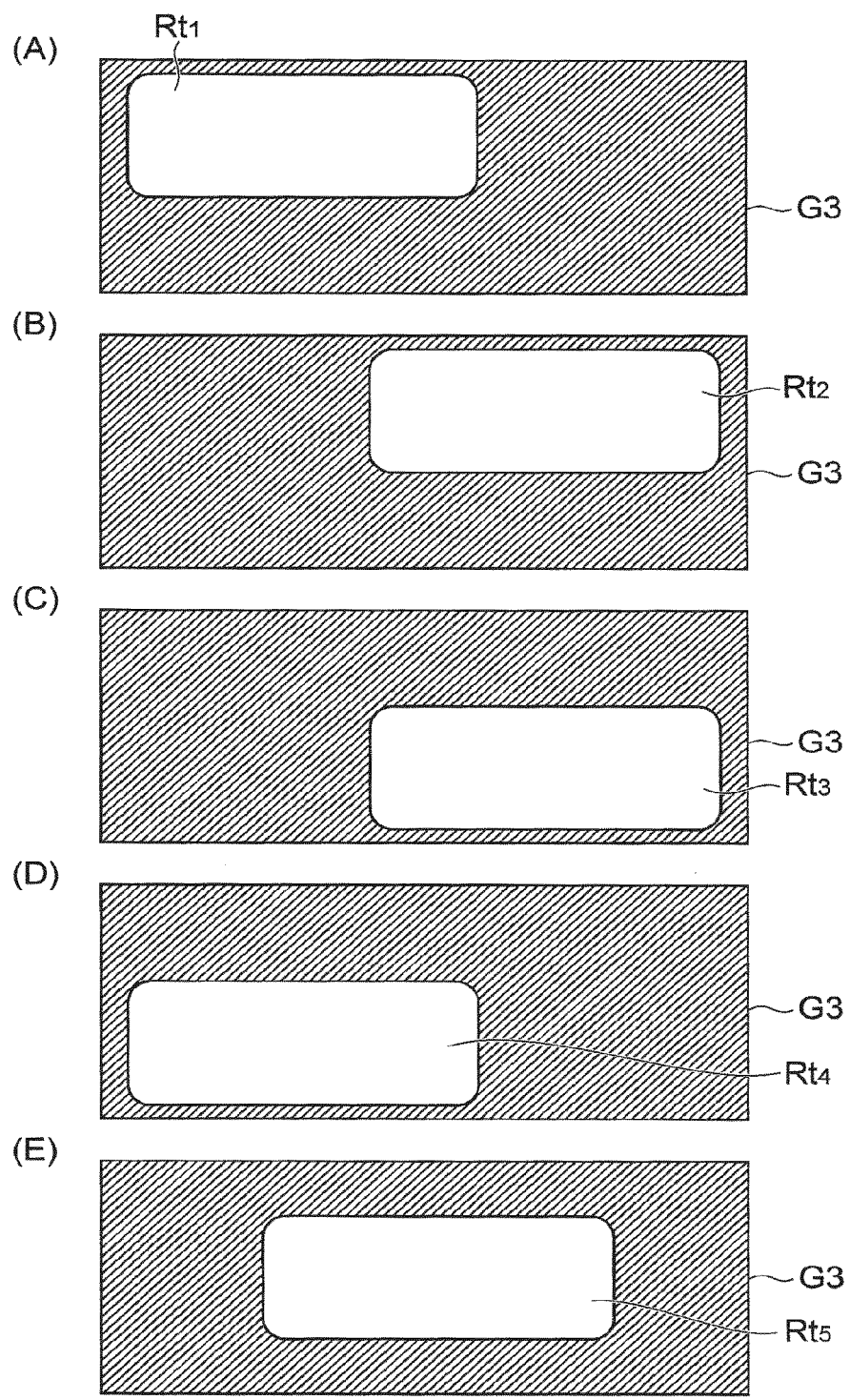
FIGS. 19A to 19E are schematic diagrams for explaining a target area image extracted from a target image.

In the process at S22, the target area image extraction unit 100 extracts a plurality of target area images from the target image input in the process at S20. For example, as depicted in FIG. 19A, the target area image extraction unit 100 extracts a target area image $Rt_1$ from an upper left area of a target image G3. In the same manner, the target area image extraction unit 100 extracts a target area image $Rt_2$ from an upper right area of the target image G3 as depicted in FIG. 19B, a target area image $Rt_3$ from an lower right area of the target image G3 as depicted in FIG. 19C, a target area image $Rt_4$ from an lower left area of the target image G3 as depicted in FIG. 19D, and a target area image $Rt_5$ from a center area of the target image G3 as depicted in FIG. 19E, respectively. Note that the target area images $Rt_1$ to $Rt_5$ are extracted in a manner of overlapping each other. When the process at S22 is completed, the flow proceeds to an image selecting process (S24).

In the process at S24, the target area image extraction unit 100 selects one image from the target area images $Rt_1$ to $Rt_5$ extracted in the process at S22. When the process at S24 is completed, the flow proceeds to a block image generation process (S26).

In the process at S26, the block image generation unit 11 divides the target area image selected in the process at S24 to generate block images. When the process at S26 is completed, the flow proceeds to a feature quantity calculation process (S28). In the process at S28, the feature quantity computing unit 12 calculates a feature quantity for each of the block images generated in the process at S26. When the process at S28 is completed, the flow proceeds to a classification process (S30). In the process at S30, the category determination unit 13 compares the feature quantity for each of the block images calculated in the process at S28 with the already-learned separating hyperplane data 31 and, with respect to block images having feature quantities of larger magnitude than a separating hyperplane for a predetermined category, determines that these block images belong to the category. When categories are determined for all block images, the flow proceeds to a selection determination process (S32).

In the process at S32, the target area image extraction unit 100 determines whether or not the classification process has been performed on all of the target area images $Rt_1$ to $Rt_5$ extracted in the process at S22. When the target area image extraction unit 100 determines that any of the target area images $Rt_1$ to $Rt_5$ that has not been selected yet exists, the flow goes back to the process at S24. The target area image extraction unit 100 then selects a target area image that has not been selected yet. The processes at S26 to S30 are performed on the target area image thus selected. In this manner, until the classification process is performed on all of the target area images $Rt_1$ to $Rt_5$, the processes at S24 to S32 are repeatedly performed. On the other hand, when the target area image extraction unit 100 determines that the classification process is performed on all of the target area images $Rt_1$ to $Rt_5$, the flow proceeds to a result output process (S34).

In the process at S34, the category determination unit 13 superimposes a classification results on a block-by-block basis of the target area images $Rt_1$ to $Rt_5$ to be output as classification results on a block-by-block basis of the target image G3. When the process at S34 is completed, the control process depicted in FIG. 18 ends.

In this manner, the control process depicted in FIG. 18 ends. By performing the control process depicted in FIG. 18, it is possible to appropriately classify even a target image having a scale change or having a shifted subject position. For example, as depicted in FIG. 20A, it is assumed that a subject is drawn on a target image G3 in a manner shifted from the center to the upper right at a small scale. In this case, with a conventional image identification device, it is difficult to recognize the image in some cases since features concerning the shape and the like are different from those for learning. In contrast, with the image identification device 1 according to the second embodiment, by the target area image extracting unit 100, the target area images $Rt_1$ to $Rt_5$ are extracted from the target image G3, and the classification process is performed on a block-by-block basis on the extracted target area images $Rt_1$ to $Rt_5$. Accordingly, as depicted in FIG. 20B, by using the target area image $Rt_2$ in which the subject is drawn in the center at a large scale, it is possible to perform the classification process on a block-by-block basis. Accordingly, it becomes possible to appropriately classify even a target image G3 having a scale change or having a shifted subject position.

Note that the above-described embodiments represent one example of the image identification device, the image identification method, the image identification program, and the recording medium according to the present invention, and are not limited to the device, the method, the program, and the recording medium according to the embodiments, and also may be modified or applied to other embodiments.

For example, in the above-described embodiments, cases in which the global feature quantity, the neighbor feature quantity, and the sub-global feature quantity in addition to the local feature quantity are used as feature quantities of an image have been described, but even when only the local feature quantity and the global feature quantity are used, it is possible to improve classification accuracy of block images obtained by dividing a target image.

What is claimed is:

1. An image identification device that learns in advance a separating plane used for classifying images into predetermined categories in a first feature quantity space using a feature of the image as a coordinate axis and uses the separating plane to classify block images obtained by dividing a target image into the categories, the image identification device comprising:

an input unit that inputs the target image;

a block image generation unit that divides the target image into a plurality of blocks to generate the block images;

a feature quantity computing unit that computes feature quantities of the block images; and a category determination unit that determines whether the block images are classified into one of the categories or not, using the separating plane and coordinate positions corresponding to magnitudes of feature quantities of the block images in the first feature quantity space, wherein the feature quantity computing unit uses, as feature quantities for the block images, local feature quantities calculated according to image information of the block images and a global feature quantity calculated according to image information of the target image as a whole, and in a second feature quantity space where a plurality of features of the block images are used as coordinate axes, using coordinate positions of feature quantity vectors made by combining the local feature quantities of the block images and using at least one optional area, the number of block images that have the feature quantity vectors belonging to the area is counted on an area-by-area basis to be included in the global feature quantity.

2. The image identification device according to claim 1, wherein the global feature quantity includes out of the block images included in the target image as a whole, the number of the block images having magnitudes of the local feature quantities equal to or larger than a predetermined value or the number of the block images having magnitudes of the local feature quantities smaller than the predetermined value.

3. The image identification device according to claim 1, further comprising a target area image extraction unit that extracts a target area from the target image to be used as a target area image, wherein
the block image generation unit divides the target area image into a plurality of blocks to generate the block images.

4. The image identification device according to claim 2, further comprising a target area image extraction unit that extracts a target area from the target image to be used as a target area image, wherein
the block image generation unit divides the target area image into a plurality of blocks to generate the block images.

5. An image identification method for learning in advance a separating plane used for classifying images into predetermined categories in a first feature quantity space using a feature of the image as a coordinate axis and then using the separating plane to classify block images obtained by dividing a target image into the categories, the image identification method comprising:
an input step of inputting the target image;
a block image generation step of dividing the target image into a plurality of blocks to generate the block images;
a feature quantity computing step of computing feature quantities of the block images; and
a category determination step of determining whether the block images are classified into one of the categories or not, using the separating plane and coordinate positions corresponding to magnitudes of feature quantities of the block images in the first feature quantity space,
wherein
at the feature quantity computing step,
as feature quantities for the block images, local feature quantities calculated according to image information of the block images and a global feature quantity calculated according to image information of the target image as a whole are used, and
in a second feature quantity space where a plurality of features of the block images are used as coordinate axes, using coordinate positions of feature quantity vectors made by combining the local feature quantities of the block images and using at least one optional area, the number of block images that have the feature quantity vectors belonging to the area is counted on an area-by-area basis to be included in the global feature quantity.

6. A non-transitory computer-readable recording medium in which an image identification program is stored that causes a computer to operate so as to learn in advance a separating plane used for classifying images into predetermined categories in a first feature quantity space using a feature of the image as a coordinate axis and use the separating plane to classify block images obtained by dividing a target image into the categories, the recording medium storing therein an image identification program that causes the computer to operate:
as an input unit that inputs the target image;
a block image generation unit that divides the target image into a plurality of blocks to generate the block images;
a feature quantity computing unit that computes feature quantities of the block images; and
a category determination unit that determines whether the block images are classified into one of the categories or not, using the separating plane and coordinate positions corresponding to magnitudes of feature quantities of the block images in the first feature quantity space,
wherein
the feature quantity computing unit uses, as feature quantities for the block images, local feature quantities calculated according to image information of the block images and a global feature quantity calculated according to image information of the target image as a whole, and
in a second feature quantity space where a plurality of features of the block images are used as coordinate axes, using coordinate positions of feature quantity vectors made by combining the local feature quantities of the block images and using at least one optional area, the number of block images that have the feature quantity vectors belonging to the area is counted on an area-by-area basis to be included in the global feature quantity.

* * * * *